US012737698B2

(12) United States Patent
Urata

(10) Patent No.: US 12,737,698 B2
(45) Date of Patent: Sep. 15, 2026

(54) OPERATION PLAN GENERATION APPARATUS, AND OPERATION PLAN GENERATION METHOD

(71) Applicant: SUMITOMO ELECTRIC INDUSTRIES, LTD., Osaka (JP)

(72) Inventor: Yu Urata, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 6 days.

(21) Appl. No.: 18/855,799

(22) PCT Filed: Feb. 14, 2023

(86) PCT No.: PCT/JP2023/004915
§ 371 (c)(1),
(2) Date: Oct. 10, 2024

(87) PCT Pub. No.: WO2023/210109
PCT Pub. Date: Nov. 2, 2023

(65) Prior Publication Data

US 2025/0252369 A1 Aug. 7, 2025

(30) Foreign Application Priority Data

Apr. 28, 2022 (JP) ................................ 2022-074649

(51) Int. Cl.
*G06Q 10/083* (2024.01)
*G06Q 10/063* (2023.01)
*G06Q 10/0631* (2023.01)

(52) U.S. Cl.
CPC ... *G06Q 10/063112* (2013.01); *G06Q 10/083* (2013.01)

(58) Field of Classification Search
None
See application file for complete search history.

(56) References Cited

U.S. PATENT DOCUMENTS 10,078,337 B1 * 9/2018 Yao .................... G01C 21/3492
2012/0253892 A1 * 10/2012 Davidson ........... G06Q 10/0631 705/7.42

(Continued)

FOREIGN PATENT DOCUMENTS

JP 2002-324294 A 11/2002
JP 2008-536778 A 9/2008

(Continued)

OTHER PUBLICATIONS

Y. Chen, D. Guo, M. Xu, G. Tang, T. Zhou and B. Ren, "PPtaxi: Non-Stop Package Delivery via Multi-Hop Ridesharing," in IEEE Transactions on Mobile Computing, vol. 19, No. 11, pp. 2684-2698 (Year: 2020).*

*Primary Examiner* — Jerry O'Connor
*Assistant Examiner* — Philip N Warner
(74) *Attorney, Agent, or Firm* — Oliff PLC

(57) ABSTRACT

An operation plan generation apparatus includes an operation plan input unit configured to receive an input of a first operation plan, the first operation plan being an operation plan of a vehicle, a work time estimation unit configured to estimate a work time of a driver at an operation destination, based on the first operation plan, external information including a possible influencing event for realization of the first operation plan, and feature data indicating a feature of at least one of the driver of the vehicle and the operation destination of the vehicle, a travel time estimation unit configured to estimate a travel time of the vehicle from an operation origin to the operation destination, based on the first operation plan, the external information, and the feature data, and an operation plan creation unit configured to correct the first operation plan.

19 Claims, 25 Drawing Sheets

| Delivery ID | Delivery date and time | Vehicle ID | Driver ID | Delivery source representative point coordinates | Delivery destination representative point coordinates | Number of parcels (pieces) | Travel time (minutes) | Work time (minutes) |
|---|---|---|---|---|---|---|---|---|
| XX-1 | 20YY/MM/DD 10:00 | 001 | A | X3,Y3 | X1,Y1 | 5 | 50 | 20 |
| XX-2 | 20YY/MM/DD 11:00 | 002 | B | X1,Y1 | X2,Y2 | 10 | 150 | 30 |
| XX-3 | 20YY/MM/DD 12:00 | 003 | C | X2,Y2 | X3,Y3 | 12 | 120 | 35 |

(56) References Cited

U.S. PATENT DOCUMENTS

| | | | | |
|---|---|---|---|---|
| 2015/0248795 | A1* | 9/2015 | Davidson | G07C 5/008<br>701/1 |
| 2016/0350837 | A1* | 12/2016 | Williams | G06Q 50/12 |
| 2017/0161817 | A1* | 6/2017 | Othmer | G06Q 30/0639 |
| 2018/0081374 | A1* | 3/2018 | Nimchuk | G06Q 10/02 |
| 2019/0049927 | A1* | 2/2019 | Gould | G06F 9/542 |
| 2019/0197475 | A1* | 6/2019 | Bianconcini | G05D 1/0287 |
| 2020/0005240 | A1* | 1/2020 | Ko | G06Q 10/047 |
| 2021/0293555 | A1* | 9/2021 | Roherty | G01C 21/3415 |
| 2021/0304133 | A1* | 9/2021 | Anandam | G06N 20/00 |
| 2022/0180281 | A1* | 6/2022 | Walton | G06Q 10/063114 |
| 2023/0144372 | A1* | 5/2023 | Venkatesh | G06Q 10/06311<br>705/7.13 |

FOREIGN PATENT DOCUMENTS

| | | | | |
|---|---|---|---|---|
| JP | 2015-059042 A | | 3/2015 | |
| JP | 2019-149116 A | | 9/2019 | |
| JP | 2019-215643 A | | 12/2019 | |
| JP | 2020-095315 A | | 6/2020 | |
| JP | 2020-126512 A | | 8/2020 | |
| JP | 2022119392 A | * | 8/2022 | |
| WO | 2006/113588 A2 | | 10/2006 | |
| WO | 2006/113588 A3 | | 8/2007 | |
| WO | WO-2016077677 A1 | * | 5/2016 | G06Q 10/1093 |
| WO | 2021/059395 A1 | | 4/2021 | |

* cited by examiner

FIG. 2

| Delivery ID | Delivery date and time | Vehicle ID | Driver ID | Delivery source representative point coordinates | Delivery destination representative point coordinates | Number of parcels (pieces) | Travel time (minutes) | Work time (minutes) |
|---|---|---|---|---|---|---|---|---|
| XX-1 | 20YY/MM/DD 10:00 | 001 | A | X3,Y3 | X1,Y1 | 5 | 50 | 20 |
| XX-2 | 20YY/MM/DD 11:00 | 002 | B | X1,Y1 | X2,Y2 | 10 | 150 | 30 |
| XX-3 | 20YY/MM/DD 12:00 | 003 | C | X2,Y2 | X3,Y3 | 12 | 120 | 35 |

FIG. 3

| Vehicle ID | Delivery source representative point coordinates | Delivery destination representative point coordinates | Travel time (minutes) | Work time (minutes) |
|---|---|---|---|---|
| 001 | X3,Y3 | X1,Y1 | 50 | 20 |
| 002 | X1,Y1 | X2,Y2 | 150 | 30 |
| 003 | X2,Y2 | X3,Y3 | 120 | 35 |

FIG. 4

| Delivery ID | Driver ID | Delivery source representative point coordinates | Delivery destination representative point coordinates | Number of parcels (pieces) | Travel time (minutes) | Work time (minutes) |
|---|---|---|---|---|---|---|
| XX-1 | A | X3,Y3 | X1,Y1 | 5 | 50 | 20 |
| XX-2 | B | X1,Y1 | X2,Y2 | 10 | 150 | 30 |
| XX-3 | C | X2,Y2 | X3,Y3 | 12 | 120 | 35 |

FIG. 5

| Delivery ID | Weather | Congestion |
|---|---|---|
| XX-1 | Sunny | No |
| XX-2 | Rainy | Yes |
| XX-3 | Cloudy | Yes |

FIG. 6

| Driver ID | Worker features |
|---|---|
| A | Expert |
| B | Novice |
| C | Expert |

FIG. 7

| Delivery destination representative point coordinates | Work location | Inspection | Waiting for parcel |
|---|---|---|---|
| X1,Y1 | Good | No | Yes |
| X2,Y2 | Bad | Yes | No |
| X3,Y3 | Normal | No | Yes |

FIG. 8A

| Delivery ID | Weather | Driver ID | Delivery destination representative point coordinates | Number of parcels (pieces) | Work time (minutes) |
|---|---|---|---|---|---|
| XX-1 | Sunny | A | X1,Y1 | 5 | 20 |
| XX-2 | Rainy | B | X2,Y2 | 10 | 30 |
| XX-3 | Cloudy | C | X3,Y3 | 12 | 35 |

FIG. 8B

| Weather | Worker features | Work location | Inspection | Waiting for parcel | Number of parcels (pieces) | Work time (minutes) |
|---|---|---|---|---|---|---|
| Sunny | Expert | Good | No | Yes | 5 | 20 |
| Rainy | Novice | Bad | Yes | No | 10 | 30 |
| Cloudy | Expert | Normal | No | Yes | 12 | 35 |

FIG. 9A

[Conversion table 1]

| Weather | Sunny or not | Rainy or not | Cloudy or not |
|---|---|---|---|
| Sunny | 1 | 0 | 0 |
| Rainy | 0 | 1 | 0 |
| Cloudy | 0 | 0 | 1 |

[Conversion table 2]

| Worker features | Worker features |
|---|---|
| Expert | 1 |
| novice (experienced) | 0 |

[Conversion table 3]

| Work location | Good work location or not | Normal work location or not | Bad work location or not |
|---|---|---|---|
| Good | 1 | 0 | 0 |
| Normal | 0 | 1 | 0 |
| Bad | 0 | 0 | 1 |

[Conversion table 4]

| Inspection | Inspection |
|---|---|
| Yes | 1 |
| No | 0 |

[Conversion table 5]

| Waiting for parcel | Waiting for parcel |
|---|---|
| Yes | 1 |
| No | 0 |

FIG. 9B

| Sunny or not | Rainy or not | Cloudy or not | Worker features | Good work location or not | Normal work location or not | Bad work location or not | Inspection | Waiting for parcel | Number of parcels (pieces) | Work time (minutes) |
|---|---|---|---|---|---|---|---|---|---|---|
| 1 | 0 | 0 | 1 | 1 | 0 | 0 | 0 | 1 | 5 | 20 |
| 0 | 1 | 0 | 0 | 0 | 1 | 0 | 1 | 0 | 10 | 30 |
| 0 | 0 | 1 | 1 | 0 | 0 | 1 | 0 | 1 | 12 | 35 |

FIG. 10A

| Delivery ID | Weather | Congestion | Driver ID | Delivery source representative point coordinates | Delivery destination representative point coordinates | Travel time (minutes) |
|---|---|---|---|---|---|---|
| XX-1 | Sunny | No | A | X3,Y3 | X1,Y1 | 50 |
| XX-2 | Rainy | Yes | B | X1,Y1 | X2,Y2 | 150 |
| XX-3 | Cloudy | Yes | C | X2,Y2 | X3,Y3 | 120 |

FIG. 10B

| Weather | Congestion | Worker features | Delivery source representative point coordinates | Delivery destination representative point coordinates | Travel time (minutes) |
|---|---|---|---|---|---|
| Sunny | No | Expert | X3,Y3 | X1,Y1 | 50 |
| Rainy | Yes | Novice | X1,Y1 | X2,Y2 | 150 |
| Cloudy | Yes | Expert | X2,Y2 | X3,Y3 | 120 |

FIG. 11A

[Conversion table 1]

| Congestion | Congestion |
|---|---|
| Yes | 1 |
| No | 0 |

[Conversion table 2]

| Delivery source representative point coordinates | Delivery destination representative point coordinates | (X3, Y3) →(X1, Y1) | (X1, Y1) →(X2, Y2) | (X2, Y2) →(X3, Y3) |
|---|---|---|---|---|
| X3,Y3 | X1,Y1 | 1 | 0 | 0 |
| X1,Y1 | X2,Y2 | 0 | 1 | 0 |
| X2,Y2 | X3,Y3 | 0 | 0 | 1 |

FIG. 11B

| Sunny or not | Rainy or not | Cloudy or not | Congestion | Worker features | (X3, Y3) →(X1, Y1) | (X1, Y1) →(X2, Y2) | (X2, Y2) →(X3, Y3) | Travel time (minutes) |
|---|---|---|---|---|---|---|---|---|
| 1 | 0 | 0 | 0 | 1 | 1 | 0 | 0 | 50 |
| 0 | 1 | 0 | 1 | 0 | 0 | 1 | 0 | 150 |
| 0 | 0 | 1 | 1 | 1 | 0 | 0 | 1 | 120 |

FIG. 12

| Sunny or not | Rainy or not | Cloudy or not | Worker features | Good work location or not | Normal work location or not | Bad work location or not | Inspection | Waiting for parcel | Number of parcels (pieces) | Work time (minutes) |
|---|---|---|---|---|---|---|---|---|---|---|
| 1 | 0 | 0 | 1 | 1 | 0 | 0 | 0 | 1 | 5 | 20 |
| 0 | 1 | 0 | 0 | 0 | 1 | 0 | 1 | 0 | 10 | 30 |
| 0 | 0 | 1 | 1 | 0 | 0 | 1 | 0 | 1 | 12 | 35 |
| ⇩ x1 | ⇩ x2 | ⇩ x3 | ⇩ x4 | ⇩ x5 | ⇩ x6 | ⇩ x7 | ⇩ x8 | ⇩ x9 | ⇩ x10 | ⇩ y |

FIG. 13

| Sunny or not | Rainy or not | Cloudy or not | Congestion | Worker features | (X3, Y3) →(X1, Y1) | (X1, Y1) →(X2, Y2) | (X2, Y2) →(X3, Y3) | Travel time (minutes) |
|---|---|---|---|---|---|---|---|---|
| 1 | 0 | 0 | 0 | 1 | 1 | 0 | 0 | 50 |
| 0 | 1 | 0 | 1 | 0 | 0 | 1 | 0 | 150 |
| 0 | 0 | 1 | 1 | 1 | 0 | 0 | 1 | 120 |
| ⇩ | ⇩ | ⇩ | ⇩ | ⇩ | ⇩ | ⇩ | ⇩ | ⇩ |
| x1 | x2 | x3 | x4 | x5 | x6 | x7 | x8 | y |

FIG. 14A

| α1 | α2 | α3 | α4 | α5 | α6 | α7 | α8 | α9 | α10 | c | MAPE |
|---|---|---|---|---|---|---|---|---|---|---|---|
| 1 | 2 | 1 | 1 | 1 | 1 | 2 | 1 | 3 | 2 | 1 | 0.0091 |

FIG. 14B

| α1 | α2 | α3 | α4 | α5 | α6 | α7 | α8 | c | MAPE |
|---|---|---|---|---|---|---|---|---|---|
| 1 | 2 | 1 | 2 | 1 | 2 | 2 | 2 | 45 | 0.0089 |

FIG. 15

| Delivery ID | Delivery date and time | Vehicle ID | Driver ID | Delivery source representative point coordinates | Delivery destination representative point coordinates | Number of parcels (pieces) | Travel time (minutes) | Work time (minutes) |
|---|---|---|---|---|---|---|---|---|
| XX-4 | 20YY/MM/DD 13:00 | 002 | B | X3,Y3 | X1,Y1 | 5 | 55 | 20 |

FIG. 16A

| Delivery ID | Weather | Driver ID | Delivery destination representative point coordinates | Number of parcels (pieces) | Work time (minutes) |
|---|---|---|---|---|---|
| XX-1 | Sunny | B | X1,Y1 | 5 | 20 |

FIG. 16B

| Weather | Worker features | Work location | Inspection | Waiting for parcel | Number of parcels (pieces) | Work time (minutes) |
|---|---|---|---|---|---|---|
| Sunny | Novice | Good | No | Yes | 5 | 20 |

FIG. 17

| Sunny or not | Rainy or not | Cloudy or not | Worker features | Good work location or not | Normal work location or not | Bad work location or not | Inspection | Waiting for parcel | Number of parcels (pieces) | Work time (minutes) |
|---|---|---|---|---|---|---|---|---|---|---|
| 1 | 0 | 0 | 0 | 1 | 0 | 0 | 0 | 1 | 5 | 20 |

FIG. 18A

| $\alpha 1$ | $\alpha 2$ | $\alpha 3$ | $\alpha 4$ | $\alpha 5$ | $\alpha 6$ | $\alpha 7$ | $\alpha 8$ | $\alpha 9$ | $\alpha 10$ | c | MAPE |
|---|---|---|---|---|---|---|---|---|---|---|---|
| 1 | 2 | 1 | 1 | 1 | 1 | 2 | 1 | 3 | 2 | 1 | 0.0091 |

FIG. 18B

| Sunny or not | Rainy or not | Cloudy or not | Worker features | Good work location or not | Normal work location or not | Bad work location or not | Inspection | Waiting for parcel | Number of parcels (pieces) | Work time (minutes) |
|---|---|---|---|---|---|---|---|---|---|---|
| 1 | 0 | 0 | 0 | 1 | 0 | 0 | 0 | 1 | 5 | 16 |

FIG. 19

| Delivery destination representative point coordinates | Planned work time | Estimated work time |
| --- | --- | --- |
| X1,Y1 | 20 minutes | 16 minutes |
| X2,Y2 | 30 minutes | 25 minutes |
| X3,Y3 | 35 minutes | 40 minutes |

Execution of work time estimation

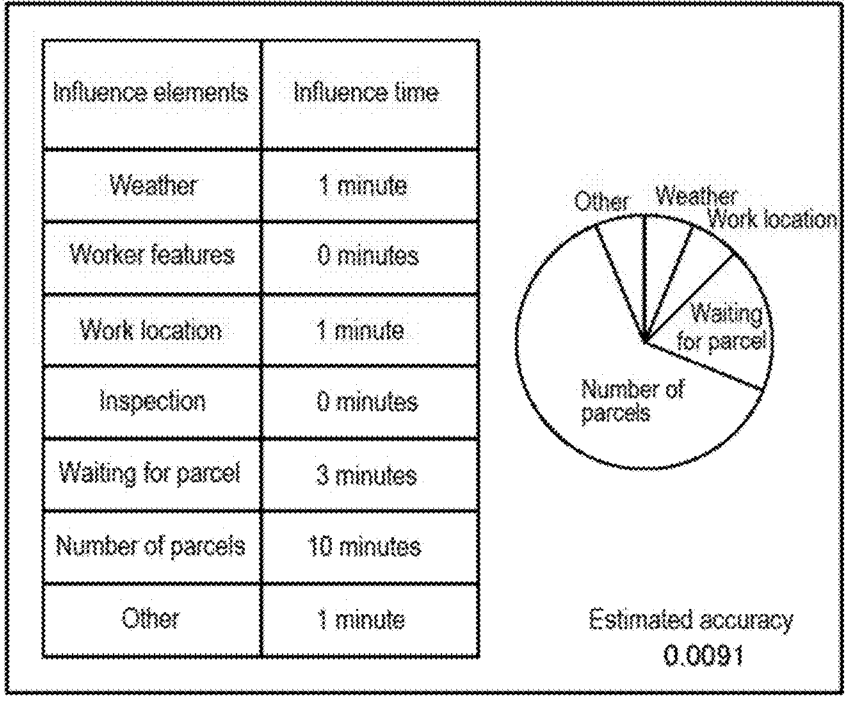

| Influence elements | Influence time |
| --- | --- |
| Weather | 1 minute |
| Worker features | 0 minutes |
| Work location | 1 minute |
| Inspection | 0 minutes |
| Waiting for parcel | 3 minutes |
| Number of parcels | 10 minutes |
| Other | 1 minute |

FIG. 21A

| Weather | Congestion | Driver ID | Delivery source representative point coordinates | Delivery destination representative point coordinates | Travel time (minutes) |
|---|---|---|---|---|---|
| Sunny | Yes | B | X3,Y3 | X1,Y1 | 55 |

FIG. 21B

| Weather | Congestion | Worker features | Delivery source representative point coordinates | Delivery destination representative point coordinates | Travel time (minutes) |
|---|---|---|---|---|---|
| Sunny | Yes | Novice | X3,Y3 | X1,Y1 | 55 |

FIG. 22

| Sunny or not | Rainy or not | Cloudy or not | Congestion | Worker features | (X3, Y3) →(X1, Y1) | (X1, Y1) →(X2, Y2) | (X2, Y2) →(X3, Y3) | Travel time (minutes) |
|---|---|---|---|---|---|---|---|---|
| 1 | 0 | 0 | 1 | 0 | 1 | 0 | 0 | 55 |

FIG. 23A

| $\alpha 1$ | $\alpha 2$ | $\alpha 3$ | $\alpha 4$ | $\alpha 5$ | $\alpha 6$ | $\alpha 7$ | $\alpha 8$ | c | MAPE |
|---|---|---|---|---|---|---|---|---|---|
| 1 | 2 | 1 | 2 | 1 | 2 | 2 | 2 | 45 | 0.0089 |

FIG. 23B

| Sunny or not | Rainy or not | Cloudy or not | Congestion | Worker features | (X3, Y3) →(X1, Y1) | (X1, Y1) →(X2, Y2) | (X2, Y2) →(X3, Y3) | Travel time (minutes) |
|---|---|---|---|---|---|---|---|---|
| 1 | 0 | 0 | 1 | 0 | 1 | 0 | 0 | 50 |

FIG. 24

| Delivery ID | Delivery date and time | Vehicle ID | Driver ID | Delivery source representative point coordinates | Delivery destination representative point coordinates | Number of parcels (pieces) | Travel time (minutes) | Work time (minutes) |
|---|---|---|---|---|---|---|---|---|
| XX-4 | 20YY/MM/DD 13:00 | 002 | B | X3,Y3 | X1,Y1 | 5 | 50 | 16 |

OPERATION PLAN GENERATION APPARATUS, AND OPERATION PLAN GENERATION METHOD

TECHNICAL FIELD

The present disclosure relates to an operation plan generation apparatus, an estimation model generation apparatus, an operation plan generation method, and a computer program. This application claims priority based on Japanese Patent Application No. 2022-074649 filed on Apr. 28, 2022, and the entire contents of the Japanese patent application are incorporated herein by reference.

BACKGROUND ART

An operation plan system is known which plans an operation route to a delivery destination of a delivery target such as a parcel or a person, an estimated arrival time, an estimated stay time at the delivery destination, and the like.

Patent literature 1 discloses a delivery plan evaluation system for evaluating a delivery plan based on a target time set for each delivery destination and a delivery result time based on the delivery plan.

CITATION LIST

Patent Literature

Patent literature 1: Japanese Unexamined Patent Application Publication No. 2020-95315

SUMMARY OF THE INVENTION

An operation plan generation apparatus according to an aspect of the present disclosure includes an operation plan input unit configured to receive an input of a first operation plan, the first operation plan being an operation plan of a vehicle, a work time estimation unit configured to estimate a work time of a driver at an operation destination, based on the first operation plan, external information including a possible influencing event for realization of the first operation plan, and feature data indicating a feature of at least one of the driver of the vehicle and the operation destination of the vehicle, a travel time estimation unit configured to estimate a travel time of the vehicle from an operation origin to the operation destination, based on the first operation plan, the external information, and the feature data, and an operation plan creation unit configured to correct the first operation plan, based on the estimated work time and the estimated travel time.

An operation plan generation apparatus according to another aspect of the present disclosure includes a work time estimation unit configured to estimate a work time of a driver at an operation destination, based on external information including a possible influencing event for realization of an operation plan of a vehicle to the operation destination and feature data indicating a feature of at least one of the driver of the vehicle and the operation destination, and a travel time estimation unit configured to estimate a travel time of the vehicle to the operation destination, based on the operation plan, the external information, and the feature data.

An estimation model generation apparatus according to another aspect of the present disclosure includes an operation result acquisition unit configured to acquire operation result information corresponding to an operation plan of a vehicle to an operation destination, and an estimation model generation unit configured to generate an estimation model, based on the operation result information, external information including a possible influencing event for realization of the operation plan, and feature data indicating a feature of at least one of a driver of the vehicle and the operation destination, the estimation model being configured to estimate at least one of a travel time to the operation destination and a work time of the driver at the operation destination.

An operation plan generation method according to another aspect of the present disclosure includes receiving, at an operation plan generation apparatus, an input of a first operation plan, the first operation plan being an operation plan of a vehicle, estimating, at the operation plan generation apparatus, a work time of a driver at an operation destination, based on the first operation plan, external information including a possible influencing event for realization of the first operation plan, and feature data indicating a feature of at least one of the driver of the vehicle and the operation destination of the vehicle, estimating, at the operation plan generation apparatus, a travel time of the vehicle from an operation origin to the operation destination, based on the first operation plan, the external information, and the feature data, and correcting, at the operation plan generation apparatus, the first operation plan, based on the estimated work time and the estimated travel time.

A computer program according to another aspect of the present disclosure causing a computer to function as an operation plan input unit configured to receive an input of a first operation plan, the first operation plan being an operation plan of a vehicle, a work time estimation unit configured to estimate a work time of a driver at an operation destination, based on the first operation plan, external information including a possible influencing event for realization of the first operation plan, and feature data indicating a feature of at least one of the driver of the vehicle and the operation destination of the vehicle, a travel time estimation unit configured to estimate a travel time of the vehicle from an operation origin to the operation destination, based on the first operation plan, the external information, and the feature data, and an operation plan creation unit configured to correct the first operation plan, based on the estimated work time and the estimated travel time.

BRIEF DESCRIPTION OF THE DRAWINGS

FIG. 2 is a diagram showing an example of operation plan information.

FIG. 3 is a diagram showing an example of operation result information that the operation result acquisition unit acquires from the vehicle-mounted apparatus.

FIG. 4 is a diagram showing an example of operation result information stored in the operation result information storage unit.

FIG. 5 is a diagram showing an example of external information stored in an external information storage unit.

FIG. 6 is a diagram showing an example of feature data indicating features of a driver of a vehicle.

FIG. 7 is a diagram showing an example of feature data indicating a feature of a delivery destination.

FIG. 8A is a diagram showing an example of information read by the first data pre-processing unit from the operation result information storage unit, the external information storage unit, and the operation plan information storage unit.

FIG. 8B is a diagram showing an example of first work time replacement data.

FIG. 9A is a diagram for explaining the pretreatment related to the work time by the first data pre-processing unit.

FIG. 9B is a diagram showing an example of first work time digitized data.

FIG. 10A is a diagram showing an example of information read by the first data pre-processing unit from the operation result information storage unit, the external information storage unit, and the operation plan information storage unit.

FIG. 10B is a diagram showing an example of first movement time replacement data.

FIG. 11A is a diagram for explaining the pretreatment related to travel time by the first data pre-processing unit.

FIG. 11B is a diagram showing an example of first travel time digitized data.

FIG. 12 is a diagram for explaining a generation method of a work time estimation model.

FIG. 13 is a diagram for explaining a generation method of a travel time estimation model.

FIG. 14A is a diagram showing an example of a work time determination model stored in an estimation model/accuracy storage unit.

FIG. 14B is a diagram showing an example of a travel time determination model stored in the estimation model/accuracy storage unit.

FIG. 15 is a diagram showing an example of operation plan information received by the operation plan input unit.

FIG. 16A is a diagram showing an example of information read by the second data pre-processing unit from the operation plan information storage unit and the external information storage unit.

FIG. 16B is a diagram showing an example of second work time replacement data.

FIG. 17 is a diagram showing an example of second work time digitized data.

FIG. 18A is a diagram showing an example of coefficients of a work time estimation model stored in an estimation model/accuracy storage unit.

FIG. 18B is a diagram showing an example of second work time digitized data generated by the second data pre-processing unit and a work time estimated by the work time estimation unit.

FIG. 19 is a diagram showing an example of an image displayed on the screen of the display device connected to the operation plan generation apparatus.

FIG. 20 is a diagram showing an example of an image displayed on the screen of the display device connected to the operation plan generation apparatus.

FIG. 21A is a diagram showing an example of information read by the third data pre-processing unit from the operation plan information storage unit and the external information storage unit.

FIG. 21B is a diagram showing an example of second travel time replacement data.

FIG. 22 is a diagram showing an example of second travel time digitized data.

FIG. 23A is a diagram showing an example of coefficients of a travel time estimation model stored in an estimation model/accuracy storage unit.

FIG. 23B is a diagram showing an example of second travel time digitized data and travel time estimated by the travel time estimation unit.

FIG. 24 is a diagram showing an example of operation plan information corrected by the operation plan creation unit.

DETAILED DESCRIPTION

Figure 1:
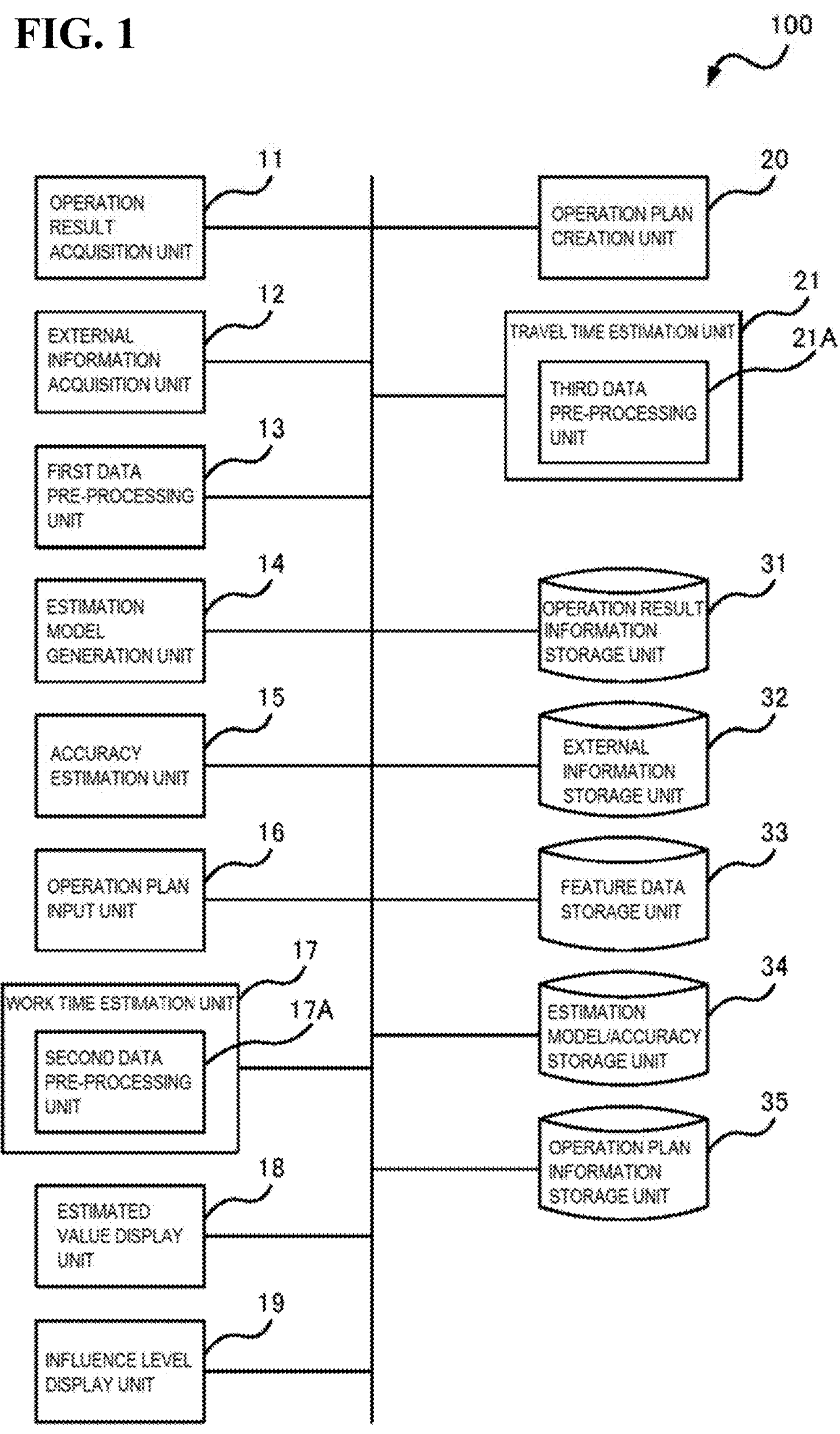
FIG. 1 is a block diagram showing the configuration of an operation plan generation apparatus according to an embodiment of the present disclosure.

Problems to be Solved by Present Disclosure

According to the delivery plan evaluation system described in Patent Literature 1, the quality of the delivery plan can be evaluated, but the appropriate work time of the worker in the delivery plan cannot be estimated. Thus, even when using the delivery plan evaluation system, there may be cases where delivery plans are generated that have either too short or too long work time for the workers.

The present disclosure has been made in view of the above circumstances, and an object of the present disclosure is to provide an operation plan generation apparatus, an estimation model generation apparatus, an operation plan generation method, and a computer program that can generate an operation plan including a work time or a travel time appropriate for a driver who drives a vehicle.

Advantageous Effects of Present Disclosure

According to the present disclosure, an operation plan including a work time and a travel time appropriate for a driver who drives a vehicle can be generated.

OVERVIEW OF EMBODIMENTS OF PRESENT DISCLOSURE

First, an overview of embodiments of the present disclosure will be listed and described.

(1) An operation plan generation apparatus according to an aspect of the present disclosure includes an operation plan input unit configured to receive an input of a first operation plan, the first operation plan being an operation plan of a vehicle, a work time estimation unit configured to estimate a work time of a driver at an operation destination, based on the first operation plan, external information including a possible influencing event for realization of the first operation plan, and feature data indicating a feature of at least one of the driver of the vehicle and the operation destination of the vehicle, a travel time estimation unit configured to estimate a travel time of the vehicle from an operation origin to the operation destination, based on the first operation plan, the external information, and the feature data, and an operation plan creation unit configured to correct the first operation plan, based on the estimated work time and the estimated travel time.

According to this configuration, the work time of the driver and the travel time of the vehicle can be estimated in consideration of the event and the feature of the driver or the operation destination which may influence the realization of the first operation plan. Thus, the operation plan including the work time and the travel time appropriate for the driver can be generated.

(2) In the above (1), the work time estimation unit may be configured to estimate the work time further based on a work time estimation model, and the work time estimation model may be generated based on operation result information corresponding to a second operation plan, the external information corresponding to the second operation plan, and the feature data corresponding to the second operation plan, the second operation plan being an operation plan of the vehicle different from the first operation plan.

According to this configuration, the work time can be estimated based on the work time estimation model generated based on the operation result information, the external information, and the feature data. Thus, the work time appropriate for the driver can be estimated.

(3) In the above (2), the operation plan generation apparatus may further include a first estimation model generation unit configured to generate the work time estimation model.

According to this configuration, the operation plan generation apparatus can generate the work time estimation model by itself. Thus, it is possible to generate the work time estimation model that takes into account the driver's past operation result information and this enables the generation of a more suitable work time estimation model for the driver.

(4) In the above (3), the operation plan generation apparatus may further include a first accuracy estimation unit configured to estimate an accuracy of the work time estimation model.

According to this configuration, the accuracy of the work time estimation model can be estimated. Thus, the accuracy of the estimated work time using the work time estimation model can be evaluated.

(5) In the above (4), the first estimation model generation unit may be configured to generate, using a plurality of estimation methods, a plurality of the work time estimation models, the first accuracy estimation unit may be configured to estimate an accuracy of each of the work time estimation models, and the work time estimation unit may be configured to estimate the work time using the work time estimation model having a highest estimated accuracy.

According to this configuration, it is possible to estimate the work time based on the most accurate work time estimation model. Thus, it is possible to estimate the work time accurately.

(6) In any one of (2) to (5), the travel time estimation unit may be configured to estimate the travel time further based on a travel time estimation model, and the travel time estimation model may be generated based on the operation result information, the external information corresponding to the second operation plan, and the feature data corresponding to the second operation plan.

According to this configuration, it is possible to estimate the travel time based on the travel time estimation model generated based on the operation result information, the external information, and the feature data. Thus, it is possible to estimate the appropriate travel time for the driver.

(7) In the above (6), the operation plan generation apparatus may further include a second estimation model generation unit configured to generate the travel time estimation model.

According to this configuration, the operation plan generation apparatus can generate the travel time estimation model by itself. Thus, it is possible to generate the travel time estimation model that takes into account the driver's past operation result information, enabling the generation of a more suitable travel time estimation model for the driver.

(8) In the above (7), the operation plan generation apparatus may further include a second accuracy estimation unit configured to estimate an accuracy of the travel time estimation model.

According to this configuration, the accuracy of the travel time estimation model can be estimated. Thus, it is possible to evaluate the accuracy of the estimated travel time using the travel time estimation model.

(9) In the above (8), the second estimation model generation unit may be configured to generate, using a plurality of estimation methods, a plurality of the travel time estimation models, the second accuracy estimation unit may be configured to estimate an accuracy of each of the travel time estimation models, and the work time estimation unit may be configured to estimate the travel time using the travel time estimation model having a highest estimated accuracy.

According to this configuration, it is possible to estimate the travel time based on the most accurate travel time estimation model. Thus, it is possible to estimate the travel time accurately.

(10) In any one of (1) to (9), the work time estimation unit may be configured to convert at least part of the first operation plan, the external information, and the feature data into a dummy variable, and estimate the work time using the dummy variable.

According to this configuration, it is possible to estimate the work time by replacing qualitative data with quantitative data.

(11) In any one of (1) to (10), the travel time estimation unit may be configured to convert at least part of the first operation plan, the external information, and the feature data into a dummy variable, and estimate the travel time using the dummy variable.

According to this configuration, it is possible to estimate the travel time by replacing qualitative data with quantitative data.

(12) In any one of (1) to (11), the external information may include any one of weather information at the operation destination, congestion information along an operation route of the vehicle, predicted weather information at the operation destination, signal information of a traffic signal present along the operation route, and biological information of the driver.

The weather information, the predicted weather information, and the biological information affect the travel time by the vehicle and the work time at the operation destination, while congestion information and signal information affect the travel time by the vehicle. Thus, by considering these pieces of information, it is possible to estimate the work time and the travel time appropriate for the driver.

(13) In any one of (1) to (12), the feature data may include at least one of data indicating a skill level of the driver and data indicating a work environment at the operation destination.

The driver's skill level affects the travel time by the vehicle and the work time at the operation destination, while the work environment at the operation destination affects the work time at the operation destination. Thus, by considering these pieces of information, it is possible to estimate the work time and the travel time appropriate for the driver.

(14) In any one of (1) to (13), the operation plan generation apparatus may further include an estimated value display unit configured to display a work time of the driver at the operation destination included in the first operation plan and the estimated work time.

According to this configuration, the user can compare the inputted work time by the user and the estimated work time. Thus, the user can know whether the inputted work time was appropriate or not, and can set the appropriate work time when manually generating an operation plan from next time.

(15) In any one of (1) to (14), the operation plan generation apparatus may further include an influence level display unit configured to display an influence level of the external information and the feature data corresponding to the estimated work time.

According to this configuration, it is possible to analyze the information or data that is influencing the work time. Thus, the work time can be improved by taking measures to reduce the influence based on the analysis result.

(16) An operation plan generation apparatus according to another aspect of the present disclosure includes a work time estimation unit configured to estimate a work time of a driver at an operation destination, based on external information including a possible influencing event for realization of an operation plan of a vehicle and feature data indicating a feature of at least one of the driver of the vehicle and the operation destination of the vehicle, and a travel time estimation unit configured to estimate a travel time of the vehicle from an operation origin to the operation destination, based on the operation plan, the external information, and the feature data.

According to this configuration, the work time of the driver and the travel time of the vehicle can be estimated in consideration of the event and the feature of the driver or the operation destination which may influence the realization of the operation plan. Thus, an operation plan including work time and travel time appropriate for the driver can be generated.

(17) An estimation model generation apparatus according to another embodiment of the present disclosure includes an operation result acquisition unit configured to acquire operation result information corresponding to an operation plan of a vehicle, and an estimation model generation unit configured to generate an estimation model, based on the operation result information, external information including a possible influencing event for realization of the operation plan, and feature data indicating a feature of at least one of a driver of the vehicle and an operation destination of the vehicle, the estimation model being configured to estimate at least one of a travel time from an operation origin to the operation destination and a work time of the driver at the operation destination.

According to this configuration, it is possible to generate an estimation model for estimating the work time or the travel time based on the operation result information, the external information, and the feature data. Thus, by using the estimation model, it is possible to estimate an appropriate work time or travel time.

(18) An operation plan generation method according to another embodiment of the present disclosure includes receiving, at an operation plan generation apparatus, an input of a first operation plan, the first operation plan being an operation plan of a vehicle, estimating, at the operation plan generation apparatus, a work time of a driver at an operation destination, based on the first operation plan, external information including a possible influencing event for realization of the first operation plan, and feature data indicating a feature of at least one of the driver of the vehicle and the operation destination of the vehicle, estimating, at the operation plan generation apparatus, a travel time of the vehicle from an operation origin to the operation destination, based on the first operation plan, the external information, and the feature data, and correcting, at the operation plan generation apparatus, the first operation plan, based on the estimated work time and the estimated travel time.

This configuration includes, as steps, the feature processing in the operation plan generation apparatus described above. Thus, according to this configuration, it is possible to achieve the same operations and effects as the aforementioned operation plan generation apparatus.

(19) A computer program according to another embodiment of the present disclosure causes a computer to function as an operation plan input unit configured to receive an input of a first operation plan, the first operation plan being an operation plan of a vehicle, a work time estimation unit configured to estimate a work time of a driver at an operation destination, based on the first operation plan, external information including a possible influencing event for realization of the first operation plan, and feature data indicating a feature of at least one of the driver of the vehicle and the operation destination of the vehicle, a travel time estimation unit configured to estimate a travel time of the vehicle from an operation origin to the operation destination, based on the first operation plan, the external information, and the feature data, and an operation plan creation unit configured to correct the first operation plan, based on the estimated work time and the estimated travel time.

According to this configuration, the computer can be caused to function as the operation plan generation apparatus described above. Thus, it is possible to achieve the same operations and effects as the aforementioned operation plan generation apparatus.

DETAILS OF EMBODIMENTS OF PRESENT DISCLOSURE

Hereinafter, embodiments of the present disclosure will be described with reference to the drawings. It is noted that, the embodiments described below are all specific examples of the present disclosure. Numerical values, shapes, materials, components, arrangement positions and connection forms of the components, steps, the order of the steps, and the like shown in the following embodiments are examples, and do not limit the present disclosure. Further, among components in the following embodiments, components not described in the independent claims are components that can be arbitrarily added. Further, each drawing is a schematic diagram and is not necessarily illustrated strictly.

The same components are denoted by the same reference numerals. The functions and names of these components are the same, and thus the description thereof will be omitted as appropriate.

[Configuration of Operation Plan Generation Apparatus]

FIG. 1 is a block diagram showing a configuration of an operation plan generation apparatus according to an embodiment of the present disclosure. Referring to FIG. 1, an operation plan generation apparatus 100 includes an operation result acquisition unit 11, an external information acquisition unit 12, a first data pre-processing unit 13, an estimation model generation unit 14, an accuracy estimation unit 15, an operation plan input unit 16, a work time estimation unit 17, an estimated value display unit 18, an influence level display unit 19, an operation plan creation unit 20, a travel time estimation unit 21, an operation result information storage unit 31, an external information storage unit 32, a feature data storage unit 33, an estimation model/accuracy storage unit 34, and an operation plan information storage unit 35. Work time estimation unit 17 includes a second data pre-processing unit 17A. Travel time estimation unit 21 includes a third data pre-processing unit 21A.

Operation plan generation apparatus 100 is composed of a general computer including a processor such as a central processing unit (CPU), a storage device such as a read only memory (ROM), a random access memory (RAM), or a hard disk drive (HDD), a communication interface, and an input/output interface.

Operation result acquisition unit 11, external information acquisition unit 12, first data pre-processing unit 13, estimation model generation unit 14, accuracy estimation unit 15, operation plan input unit 16, work time estimation unit 17, second data pre-processing unit 17A, estimated value display unit 18, influence level display unit 19, operation plan creation unit 20, travel time estimation unit 21, and third data pre-processing unit 21A are functional processing units realized by executing a computer program stored in the storage device. Operation result information storage unit 31, external information storage unit 32, feature data storage unit 33, estimation model/accuracy storage unit 34, and operation plan information storage unit 35 are implemented by a storage device.

Operation plan generation apparatus 100 performs wireless communication with a vehicle-mounted apparatus installed in a vehicle through the communication interface. The vehicle includes a position determination unit connected to the vehicle-mounted apparatus and configured to determine a position of the vehicle. The position determination unit specifies the position of the vehicle using satellite navigation. For example, the position determination unit specifies the position of the vehicle based on radio waves received from a plurality of global positioning system (GPS) satellites. The position of the vehicle can be specified by, for example, latitude and longitude. The satellite navigation uses global navigation satellite system (GNSS) such as GPS, but is not limited to GPS.

<<Operation Plan Information Storage Unit 35>>

Operation plan information storage unit 35 is a storage unit for storing operation plan information indicating an operation plan to the operation destination (delivery destination of the parcel) of the vehicle.

FIG. 2 is a diagram showing an example of operation plan information. The operation plan information includes, for example, information of "delivery ID", "delivery date and time", "vehicle ID", "driver ID", "delivery source representative point coordinates", "delivery destination representative point coordinates", "number of parcels", "travel time", and "work time". The "delivery ID" is identification information assigned to each delivery of a parcel from the delivery source to the delivery destination by the vehicle. The "delivery date and time" is information indicating the delivery date and time of the parcel to the delivery destination. The "vehicle ID" represents identification information of the vehicle that travels in accordance with the operation plan information.

The "driver ID" is identification information of a driver of the vehicle. It is noted that, the driver of the vehicle is also a worker who performs unloading, loading, and the like of the parcel. However, the driver and the operator may be planned as different persons.

The "delivery source representative point coordinates" represents coordinates of a representative point capable of specifying the delivery source of the parcel in the operation plan of the vehicle. The coordinate is a combination of latitude and longitude. For example, when the delivery source is a factory, the delivery source representative point coordinates may be coordinates of a center of the factory or coordinates of an entrance of the factory. It is noted that, the delivery source represents a departure point toward a delivery destination such as a delivery base of the vehicle or the delivery destination of the previous parcel.

The "delivery destination representative point coordinates" represents coordinates of a representative point capable of specifying the delivery destination of the parcel in the operation plan of the vehicle. For example, when the delivery destination is a factory, the delivery destination representative point coordinates may be coordinates of a center of the factory or coordinates of an entrance of the factory. The "number of parcels" is the number of parcels that the driver delivers to the delivery destination. The "travel time" is a planned time (minutes) for the vehicle to travel from the delivery source to the delivery destination.

The "work time" is a planned time (minutes) required for the driver of the vehicle to perform work at the delivery destination. The work performed at the delivery destination includes, for example, unloading, loading, and waiting in the vehicle.

For example, the operation plan information of the delivery ID "XX-1" shown in FIG. 2 indicates the following schedule. The delivery date and time of the parcel to the delivery destination is "20YY/MM/DD 10:00". The driver with the driver ID "A" drives the vehicle with the vehicle ID "001". The vehicle moves from the delivery source of coordinate (X3, Y3) to the delivery destination of coordinate (X1, Y1) in 50 minutes. The driver with the driver ID "A" performs 20-minutes work (for example, unloading) for five parcels at the delivery destination of coordinates (X1, Y1). The operation plan information of the delivery ID "XX-2" indicates the following schedule. The delivery date and time of the parcel to the delivery destination is "20YY/MM/DD 11:00". The driver with the driver ID "B" drives the vehicle with the vehicle ID "002". The vehicle moves from the delivery source of coordinate (X1, Y1) to the delivery destination of coordinate (X2, Y2) in 150 minutes. The driver with the driver ID "B" performs 30-minutes work (for example, unloading) for 10 parcels at the delivery destination of coordinates (X2, Y2). The operation plan information of the delivery ID "XX-3" indicates the following schedule. The delivery date and time of the parcel to the delivery destination is "20YY/MM/DD 12:00". The driver with the driver ID "C" drives the vehicle with the vehicle ID "003". The vehicle moves from the delivery source of coordinate (X2, Y2) to the delivery destination of coordinate (X3, Y3) in 120 minutes. The driver with the driver ID "C" performs 35-minutes work (for example, unloading) for 12 parcels at the delivery destination of coordinates (X3, Y3).

<<Operation Result Acquisition Unit 11>>

Operation result acquisition unit 11 acquires operation result information corresponding to the operation plan to the operation destination of the vehicle from a vehicle-mounted apparatus of the vehicle.

FIG. 3 is a diagram showing an example of operation result information that operation result acquisition unit 11 acquires from the vehicle-mounted apparatus. The operation result information includes, for example, information of "vehicle ID", "delivery source representative point coordinates", "delivery destination representative point coordinates", "travel time", and "work time". The "vehicle ID" represents identification information of the vehicle on which the vehicle-mounted apparatus that is a transmission source of the operation result information is mounted.

The “delivery source representative point coordinates” and “delivery destination representative point coordinates” are the same as those described with reference to FIG. 2. In the following description, the information already described will not be repeated. The “travel time” is the actual time (minutes) required for the vehicle to travel from the delivery source to the delivery destination.

The “work time” is the actual time (minutes) required for the driver of the vehicle to perform work at the delivery destination. The work performed at the delivery destination includes, for example, unloading, loading, and waiting in the vehicle.

For example, the operation result information shown in FIG. 3 indicates the following performance. The vehicle with the vehicle ID “001” moved from the delivery source of the coordinate (X3, Y3) to the delivery destination of the coordinate (X1, Y1) in 50 minutes, and the driver of the vehicle performed work for 20 minutes at the delivery destination of the coordinate (X1, Y1). The vehicle with the vehicle ID “002” moved from the delivery source of the coordinate (X1, Y1) to the delivery destination of the coordinate (X2, Y2) in 150 minutes, and the driver of the vehicle performed work for 30 minutes at the delivery destination of the coordinate (X2, Y2). The vehicle with the vehicle ID “003” moved from the delivery source of the coordinate (X2, Y2) to the delivery destination of the coordinate (X3, Y3) in 120 minutes, and the driver of the vehicle performed work for 35 minutes at the delivery destination of the coordinate (X3, Y3).

Operation result acquisition unit 11 replaces the vehicle ID with the driver ID by referring to operation plan information stored in operation plan information storage unit 35 described later. Note that, when a data table that associates the vehicle ID with the driver ID is separately stored in the storage device, operation result acquisition unit 11 may replace the vehicle ID with the driver ID based on the data table.

Operation result acquisition unit 11 adds the delivery ID to the operation result information. The “delivery ID” is identification information assigned to each delivery of the parcel from the delivery source to the delivery destination by the vehicle.

Further, operation result acquisition unit 11 adds the number of parcels to the operation plan information by referring to the operation plan information stored in operation plan information storage unit 35 described later. The number of parcels is the number of parcels delivered to the delivery destination. Operation result acquisition unit 11 writes the operation result information in operation result information storage unit 31.

<<Operation Result Information Storage Unit 31>>

Operation result information storage unit 31 is a storage unit for storing operation result information. As described above, operation result acquisition unit 11 writes the operation result information in operation result information storage unit 31.

FIG. 4 is a diagram showing an example of the operation result information stored in operation result information storage unit 31. The operation result information includes, for example, information of “delivery ID”, “driver ID”, “delivery source representative point coordinates”, “delivery destination representative point coordinates”, “number of parcels”, “travel time”, and “work time”.

For example, the operation result information of the delivery ID “XX-1” shown in FIG. 4 indicates that the vehicle driven by the driver of the driver ID “A” moved from the delivery source of coordinate (X3, Y3) to the delivery destination of coordinate (X1, Y1) in 50 minutes, and the driver of the vehicle performed work such as unloading for five parcels at the delivery destination of coordinate (X1, Y1) for 20 minutes. In FIG. 4, the operation result information of the delivery IDs “XX-2” and “XX-3” is also shown.

<<External Information Acquisition Unit 12>>

External information acquisition unit 12 acquires external information indicating an event that may influence the realization of the operation plan from an external device.

For example, external information acquisition unit 12 acquires information on weather at the delivery destination from a weather information providing server connected to operation plan generation apparatus 100 via a network. The “weather” includes, for example, sunny, rainy, and cloudy. The weather may be actual weather or may be a weather forecast.

External information acquisition unit 12 acquires information on congestion in the operation route of the vehicle from a traffic information providing server connected to operation plan generation apparatus 100 via a network. The information of “congestion” indicates, for example, the presence or absence of a congestion section on the operation route.

It is noted that, the external information is not limited to these. For example, external information acquisition unit 12 may acquire signal information (for example, signal cycle information) of a traffic signal existing on the operation route from an external server, or may acquire biological information such as a heart rate of the driver from a vehicle-mounted apparatus of the vehicle driven by the driver.

External information acquisition unit 12 acquires external information for each delivery of the parcel indicated by the delivery ID. External information acquisition unit 12 writes the acquired external information in external information storage unit 32 together with the delivery ID. For example, external information acquisition unit 12 acquires operation plan information for each delivery ID from operation plan information storage unit 35. After confirming that the delivery work to the delivery destination indicated in the acquired operation plan information has been completed, external information acquisition unit 12 acquires weather information during the stay period at the delivery destination from the weather information providing server and writes the weather information in external information acquisition unit 12.

<<External Information Storage Unit 32>>

External information storage unit 32 is a storage unit for storing external information. As described above, external information acquisition unit 12 writes the external information in external information storage unit 32.

FIG. 5 is a diagram showing an example of external information stored in external information storage unit 32. The external information includes, for example, information of “delivery ID”, “weather”, and “congestion”.

For example, the external information of the delivery ID “XX-1” shown in FIG. 5 indicates that the weather of the delivery destination is sunny and that no congestion section exits on the delivery route. Further, the external information of the delivery ID “XX-2” indicates that the weather of the delivery destination is rainy and that a congestion section exists on the delivery route. Further, the external information of the delivery ID “XX-3” indicates that the weather of the delivery destination is cloudy and that a congestion section exists on the delivery route.

<<Feature Data Storage Unit 33>>

Feature data storage unit 33 is a storage unit for storing feature data indicating a feature of at least one of the driver of the vehicle and the delivery destination. Feature data storage unit 33 stores feature data in advance.

FIG. 6 is a diagram showing an example of feature data indicating a feature of the driver of the vehicle. The feature data includes information of “driver ID” and “worker features”. The “driver ID” is identification information for identifying the driver of the vehicle.

The “worker features” is information indicating the skill level of the worker (driver). The worker features include, for example, “expert”, “experienced”, and “novice” in descending order of skill level.

For example, the feature data shown in FIG. 6 indicates that the worker features (skill level) of the drivers with driver IDs “A” and “C” are “expert”. It is noted that, the feature data also indicates that the worker features (skill level) of the driver with the driver ID “B” is “novice”.

FIG. 7 is a diagram showing an example of the feature data indicating the feature of the delivery destination. The feature data includes information of “delivery destination representative point coordinates”, “work location”, “inspection”, and “waiting for parcel”.

The “delivery destination representative point coordinates” indicates coordinates of a representative point that can specify the delivery destination of the parcel. The coordinate is a combination of latitude and longitude. For example, when the delivery source is a factory, the representative point coordinate may be a coordinate of a center of the factory or may be a coordinate of an entrance of the factory.

The “work location” is information indicating the environment of the work location where the work such as unloading and loading is performed at the delivery destination. The work location includes, for example, “good”, “normal”, and “bad” in order from the best environment. For example, “good” indicates that the work location is indoors, “normal” indicates that the work location is outdoors with a roof, and “bad” indicates that the work location is outdoors without a roof. The value of the “work location” may be determined according to the distance from the stop point of the vehicle to the unloading point. That is, the closer the distance is, the better the environment of the work location is, and the farther the distance is, the worse the environment of the work location is. The “inspection” indicates whether inspection of the parcel is performed in the work location. The “waiting for parcel” indicates whether the waiting for the parcel exits or not at the work location.

For example, the feature data shown in FIG. 7 indicates that the environment of the work location of the delivery destination of the delivery destination representative point coordinates (X1, Y1) is good, there is no inspection, and there is the waiting for the parcel. Further, the feature data indicates that the environment of the work location at the delivery destination of the delivery destination representative point coordinates (X2, Y2) is bad, there is the inspection, and there is no waiting for the parcel. Further, the feature data indicates that the environment of the work location at the delivery destination of the delivery destination representative point coordinates (X3, Y3) is normal, there is no inspection, and there is the waiting for the parcel.

<<First Data Pre-Processing Unit 13>>

First data pre-processing unit 13 reads the operation result information from operation result information storage unit 31, reads the external information from external information storage unit 32, and reads the operation plan information from operation plan information storage unit 35. First data pre-processing unit 13 executes a pretreatment of representing a part of the read information by a dummy variable, and digitizes the information. The dummy variable is a variable that takes a value of zero or one.

The pretreatment by first data pre-processing unit 13 will be described below. The pretreatment includes a pretreatment related to work time and a pretreatment related to travel time. The pretreatment related to the work time will be described with reference to FIG. 8 and FIG. 9. The pretreatment for travel time will be described with reference to FIG. 10 and FIG. 11.

(Pretreatment Related to Work Time)

FIG. 8A shows an example of information read by first data pre-processing unit 13 from operation result information storage unit 31, external information storage unit 32, and operation plan information storage unit 35. The read information includes information of “delivery ID”, “weather”, “driver ID”, “delivery destination representative point coordinates”, “number of parcels”, and “work time”. It is noted that, the operation plan information, the external information, and the operation result information of the same “delivery ID” are associated with each other.

The “weather” is included in the external information read from external information storage unit 32. The “driver ID”, the “delivery destination representative point coordinates”, and the “number of parcels” are included in the operation plan information read from operation plan information storage unit 35. The “work time” is included in the operation result information read from operation result information storage unit 31.

For example, the information of the delivery ID “XX-1” that first data pre-processing unit 13 read indicates that, during a time period of “sunny” weather, the driver with the driver ID “A” delivered “five” parcels to the delivery destination of the delivery destination representative point coordinates (X1, Y1), and performed the “20-minutes” work at the delivery destination. The information of the delivery ID “XX-2” that first data pre-processing unit 13 read indicates that, during a time period of “rainy” weather, the driver with the driver ID “B” delivered “10” parcels to the delivery destination of the delivery destination representative point coordinates (X2, Y2), and performed the “30-minutes” work at the delivery destination. The information of the delivery ID “XX-3” that first data pre-processing unit 13 read indicates that, during a time period of “cloudy” weather, the driver with the driver ID “C” delivered “12” parcels to the delivery destination of the delivery destination representative point coordinates (X3, Y3), and performed the “35-minutes” work at the delivery destination.

First data pre-processing unit 13 reads feature data indicating the feature of the driver and feature data indicating the feature of the delivery destination from feature data storage unit 33.

First data pre-processing unit 13 replaces the information read from each storage unit shown in FIG. 8A based on the feature data shown in FIG. 6 and FIG. 7. Specifically, first data pre-processing unit 13 replaces “driver ID” shown in FIG. 8A with “worker features” based on the feature data (FIG. 6) of the driver. For example, the driver ID “A” is replaced with the worker features “expert”. Similarly, the driver ID “B” is replaced with “novice”. The driver ID “C” is replaced with the worker features “expert”.

First data pre-processing unit 13 replaces "delivery destination representative point coordinates" shown in FIG. 8A with "work location", "inspection", and "waiting for parcel" based on the feature data (FIG. 7) of the delivery destination. For example, the delivery destination representative point coordinates (X1, Y1) are replaced with work location "good", inspection "no", and waiting for parcel "yes". Similarly, the delivery destination representative point coordinates (X2, Y2) are replaced with work location "bad", inspection "yes", and waiting for parcel "no". Further, the delivery destination representative point coordinates (X3, Y3) are replaced with work location "normal", inspection "no", and waiting for parcel "yes"

FIG. 8B shows an example of the data obtained by replacement (hereinafter referred to as "first work time replacement data").

The first work time replacement data includes information of "weather", "worker features", "work location", "inspection", "waiting for parcel", "number of parcels", and "work time".

The "weather", "number of parcels" and "work time" are the same as those shown in FIG. 8A. The "worker features" is data obtained by the replacement processing based on the feature data (FIG. 6) of the driver. The "work location", "inspection", and "waiting for parcel" are data obtained by the replacement processing based on the feature data (FIG. 7) of the delivery destination.

For example, the first work time replacement data includes data formed of a combination of weather "sunny", worker features "expert", work location "good", inspection "no", waiting for parcel "yes", number of parcels "five", and work time "20 minutes". The first work time replacement data includes data formed of a combination of weather "rainy", worker features "novice", work location "bad", inspection "yes", waiting for parcel "no", number of parcels "10", and work time "30 minutes". The first work time replacement data includes data formed of a combination of weather "cloudy", worker features "expert", work location "normal", inspection "no", waiting for parcel "yes", number of parcels "12", and work time "35 minutes".

FIG. 9A is a diagram for explaining the pretreatment related to the work time by first data pre-processing unit 13.

First data pre-processing unit 13 converts the first work time replacement data into a dummy variable using the conversion table shown in FIG. 9A.

[Conversion table 1] shows an example of a conversion table for converting "weather" into three dummy variables "sunny or not", "rainy or not", and "cloudy or not". The dummy variable "sunny or not" indicates that the weather is "sunny" when the value is "one", and indicates that the weather is "rainy" or "cloudy" when the value is "zero". The dummy variable "rainy or not" indicates that the weather is "rainy" when the value is "one", and indicates that the weather is "sunny" or "cloudy" when the value is "zero". The dummy variable "cloudy or not" indicates that the weather is "cloudy" when the value is "one", and indicates that the weather is "sunny" or "rainy" when the value is "zero".

For example, first data pre-processing unit 13 converts the weather "sunny" of the first work time replacement data into the dummy variable "sunny or not" as "one", the dummy variable "rainy or not" as "zero", and the dummy variable "cloudy or not" as "zero". Similarly, first data pre-processing unit 13 converts the weather "rainy" of the first work time replacement data into the dummy variable "sunny or not" as "zero", the dummy variable "rainy or not" as "one", and the dummy variable "cloudy or not" as "zero". Further, first data pre-processing unit 13 converts the weather "cloudy" of the first work time replacement data into the dummy variable "sunny or not" as "zero", the dummy variable "rainy or not" as "zero", and the dummy variable "cloudy or not" as "one".

[Conversion table 2] shows an example of a conversion table for converting "worker features" into a dummy variable "worker features". The dummy variable "worker features" indicates that the worker features is "expert" when the value is "one", and indicates that the worker features is "novice" or "experienced" when the value is "zero".

For example, first data pre-processing unit 13 converts the worker features "expert" of the first work time replacement data into the dummy variable "worker features" as "one", and converts the worker features "novice" of the first work time replacement data into the dummy variable "worker features" as "zero".

[Conversion table 3] shows an example of a conversion table for converting "work location" into three dummy variables "good work location or not", "normal work location or not", and "bad work location or not". When the dummy variable "good work location or not" is "one", it indicates that the work location is "good", and when the dummy variable "good work location or not" is "zero", it indicates that the work location is "normal" or "bad". When the dummy variable "normal work location or not" is "one", it indicates that the work location is "normal", and when the dummy variable "normal work location or not" is "zero", it indicates that the work location is "good" or "bad". When the dummy variable "bad work location or not" is "one", it indicates that the work location is "bad", and when the dummy variable "bad work location or not" is "zero", it indicates that the work location is "good" or "normal".

For example, first data pre-processing unit 13 converts the work location "good" of the first work time replacement data into the dummy variable "good work location or not" as "one", the dummy variable "normal work location or not" as "zero", and the dummy variable "bad work location or not" as "zero". Similarly, first data pre-processing unit 13 converts the work location "normal" of the first work time replacement data into the dummy variable "good work location or not" as "zero", the dummy variable "normal work location or not" as "one", and the dummy variable "bad work location or not" as "zero". First data pre-processing unit 13 converts the work location "bad" of the first work time replacement data into the dummy variable "good work location or not" as "zero", the dummy variable "normal work location or not" as "zero", and the dummy variable "bad work location or not" as "one".

[Conversion table 4] shows an example of a conversion table for converting "inspection" into a dummy variable "inspection". The dummy variable "inspection" indicates that there is the inspection when the value is "one", and indicates that there is no inspection when the value is "zero".

For example, first data pre-processing unit 13 converts inspection "yes" of the first work time replacement data into the dummy variable "inspection" as "one", and converts inspection "no" of the first work time replacement data into the dummy variable "inspection" as "zero".

[Conversion table 5] shows an example of a conversion table for converting "waiting for parcel" into the dummy variable "waiting for parcel". The dummy variable "waiting for parcel" indicates that there is a waiting for the parcel when the value is "one", and indicates that there is no waiting for the parcel when the value is "zero".

For example, first data pre-processing unit 13 converts waiting for parcel "yes" of the first work time replacement data into the dummy variable "waiting for parcel" as "one", and converts waiting for parcel "no" of the first work time replacement data into the dummy variable "waiting for parcel" as "zero".

FIG. 9B shows digitized data obtained by converting the first work time replacement data shown in FIG. 8B into the dummy variables using the conversion table shown in FIG. 9A (hereinafter referred to as "first work time digitized data").

The first work time digitized data includes each value of dummy variables "sunny or not", "rainy or not", "cloudy or not", "worker features", "good work location or not", "normal work location or not", "bad work location or not", "inspection", and "waiting for parcel", and data of "number of parcels" and "work time".

The first work time digitized data in the first line indicates that the dummy variable "sunny or not" has a value of "one", "rainy or not" has a value of "zero", "cloudy or not" has a value of "zero", "worker features" has a value of "one", "good work location or not" has a value of "one", "normal work location or not" has a value of "zero", "bad work location or not" has a value of "zero", "inspection" has a value of "zero", "waiting for parcel" has a value of "one", "number of parcels" has a value of "five", and "work time" has a value of "20 minutes". The first work time digitized data in the second line indicates that the dummy variable "sunny or not" has a value of "zero", "rainy or not" has a value of "one", "cloudy or not" has a value of "zero", "worker features" has a value of "zero", "good work location or not" has a value of "zero", "normal work location or not" has a value of "one", "bad work location or not" has a value of "zero", "inspection" has a value of "one", "waiting for parcel" has a value of "zero", "number of parcels" has "10", and "work time" has a value of "30 minutes". The first work time digitized data in the third line indicates that the dummy variable "sunny or not" has a value of "zero", "rainy or not" has a value of "zero", "cloudy or not" has a value of "one", "worker features" has a value of "one", "good work location or not" has a value of "zero", "normal work location or not" has a value of "zero", "bad work location or not" has a value of "one", "inspection" has a value of "zero", "waiting for parcel" has a value of "one", "number of parcels" has a value of "12", and "work time" has a value of "35 minutes".

(Pretreatment for Travel Time)

FIG. 10A shows an example of information read by first data pre-processing unit 13 from operation result information storage unit 31, external information storage unit 32, and operation plan information storage unit 35. The read information includes information of "delivery ID", "weather", "congestion", "driver ID", "delivery source representative point information", "delivery destination representative point information", and "travel time". It is noted that, the operation plan information, the external information, and the operation result information of the same "delivery ID" are associated with each other.

The "weather" and "congestion" are included in the external information read from external information storage unit 32. The "driver ID", the "delivery source representative point information", and the "delivery destination representative point information" are included in the operation plan information read from operation plan information storage unit 35. The "travel time" is included in the operation result information read from operation result information storage unit 31.

For example, the information read by first data pre-processing unit 13 includes three sets of information. The first (first line) information with a delivery ID of "XX-1" indicates that, during a time period of "sunny" weather, there is no congestion, and the driver identified by the driver ID "A" moved from the delivery source of the delivery source representative point coordinates (X3, Y3) to the delivery destination of the delivery destination representative point coordinates (X1, Y1) in "50 minutes". The second and third information also represent the actual performance information of travel time.

First data pre-processing unit 13 reads the feature data of the driver from feature data storage unit 33.

First data pre-processing unit 13 replaces the information read from each storage unit shown in FIG. 10A based on the feature data shown in FIG. 6. Specifically, first data pre-processing unit 13 replaces "driver ID" shown in FIG. 10A with "worker features" based on the feature data (FIG. 6) of the driver. For example, the driver ID "A" is replaced with the worker features "expert". Similarly, the driver IDs "B" and "C" are replaced with the worker features "novice" and "expert", respectively.

FIG. 10B shows data obtained by replacement (hereinafter referred to as "first movement time replacement data").

The first movement time replacement data includes information of "weather", "congestion", "worker features", "delivery source representative point coordinates", "delivery destination representative point coordinates", and "travel time".

The "worker features" is data obtained by the replacement processing based on the feature data (FIG. 6) of the driver. The data other than "worker features" is the same as that shown in FIG. 10A.

For example, the first movement time replacement data in the first line represents weather "sunny", congestion "no", worker features "expert", delivery source representative point coordinates (X3, Y3), delivery destination representative point coordinates (X1, Y1), and travel time "50 minutes". Similarly, the first movement time replacement data in the second and third lines represents the actual result information of the travel time after the replacement.

FIG. 11A is a diagram for explaining the pretreatment related to travel time by first data pre-processing unit 13.

First data pre-processing unit 13 converts the first movement time replacement data into the dummy variables using the conversion table shown in FIG. 9A and FIG. 11A.

First data pre-processing unit 13 converts "weather" of the first movement time replacement data into dummy variables "sunny or not", "rainy or not", and "cloudy or not" using [Conversion table 1] of FIG. 9A.

[Conversion table 1] of FIG. 11A shows an example of a conversion table for converting "congestion" into the dummy variable "congestion". The dummy variable "congestion" indicates that there is the congestion when the value is "one", and indicates that there is no congestion when the value is "zero".

For example, first data pre-processing unit 13 converts congestion "yes" of the first movement time replacement data into the dummy variable "congestion" as "one", and converts congestion "no" of the first movement time replacement data into the dummy variable "congestion" as "zero".

First data pre-processing unit 13 converts the "worker features" of the first movement time replacement data into the dummy variable "worker features" using [Conversion table 2] shown in FIG. 9A. The conversion method is the same as the conversion method of the "worker features" of the first work time replacement data described with reference to FIG. 9A.

[Conversion Table 2] in FIG. 11A shows an example of a conversion table used to convert combinations of "delivery source representative point coordinates" and "delivery destination representative point coordinates" into three dummy variables: "(X3, Y3)→(X1, X1)", "(X1, Y1)→(X2, X2)", and "(X2, Y2)→(X3, X3)". The dummy variable "(Xa, Ya)→(Xb, Xb)" indicates that the delivery source representative point coordinates are "Xa, Ya" and the delivery destination representative point coordinates are "Xb, Yb" when the value is "one", and indicates that the combination of the delivery source representative point coordinates and the delivery source representative point coordinates is other than the above when the value is "zero". However, a is 1, 2 or 3, b is 1, 2 or 3, and a and b are different values.

For example, first data pre-processing unit 13 converts the combination of the delivery source representative point coordinates (X3, Y3) and the delivery destination representative point coordinates (X1, Y1) into the dummy variable "(X3, Y3)→(X1, X1)" as "one", the dummy variable "(X1, Y1)→(X2, X2)" as "zero", and the dummy variable "(X2, Y2)→(X3, X3)" as "zero". Similarly, first data pre-processing unit 13 converts the combination of the delivery source representative point coordinates (X1, Y1) and the delivery destination representative point coordinates (X2, Y2) into the dummy variable "(X3, Y3)→(X1, X1)" as "zero", the dummy variable "(X1, Y1)→(X2, X2)" as "one", and the dummy variable "(X2, Y2)→(X3, X3)" as "zero". Further, first data pre-processing unit 13 converts the combination of the delivery source representative point coordinates (X2, Y2) and the delivery destination representative point coordinates (X3, Y3) into the dummy variable "(X3, Y3)→(X1, X1)" as "zero", the dummy variable "(X1, Y1)→(X2, X2)" as "zero", and the dummy variable "(X2, Y2)→(X3, X3)" as "one".

FIG. 11B shows data (hereinafter referred to as "first travel time digitized data") obtained by digitizing the first movement time replacement data shown in FIG. 10B as the dummy variables using the conversion table shown in FIG. 11A.

The first travel time digitized data includes each value of the dummy variables "sunny or not", "rainy or not", "cloudy or not", "congestion", "worker features", "(X3, Y3)→(X1, X1)", "(X1, Y1)→(X2, X2)", and "(X2, Y2)→(X3, X3)", and information of the "travel time".

The first line of the first travel time digitized data indicates that the dummy variables "sunny or not", "rainy or not", "cloudy or not", "congestion", "worker features", "(X3, Y3)→(X1, X1)", "(X1, Y1)→(X2, X2)", and "(X2, Y2)→(X3, X3)" have values of "one", "zero", "zero", "zero", "one", "one", "zero", "zero" respectively, and the "travel time" is "50 minutes". The first travel time digitized data in the second and third lines also indicates the value of each dummy variable and travel time.

<<Estimation Model Generation Unit 14>>

Estimation model generation unit 14 generates a work time estimation model for estimating the work time of the driver at the delivery destination based on the first work time digitized data generated by first data pre-processing unit 13. Estimation model generation unit 14 generates a travel time estimation model for estimating the travel time from the delivery source to the delivery destination based on the first travel time digitized data generated by first data pre-processing unit 13. It is noted that, estimation model generation unit 14 may be separately provided with a first estimation model generation unit configured to generate the work time estimation model and a second estimation model generation unit configured to generate the travel time estimation model. Hereinafter, the generation method of the work time estimation model and the generation method of the travel time estimation model will be described in order.

(Generation Method of Work Time Estimation Model)

FIG. 12 is a diagram for explaining a generation method of a work time estimation model. Further, estimation model generation unit 14 acquires the first work time digitized data from first data pre-processing unit 13. An example of the first work time digitized data shown in FIG. 12 is the same as that shown in FIG. 9B.

As shown in FIG. 12, estimation model generation unit 14 sets the work time of [first work time digitized data] to an objective variable y. Estimation model generation unit 14 sets each dummy variable and number of parcels to the explanatory variables. That is, estimation model generation unit 14 sets "sunny or not" to the explanatory variable x1, "rainy or not" to x2, "cloudy or not" to x3, "worker features" to x4, "good work location or not" to x5, "normal work location or not" to x6, "bad work location or not" to x7, "inspection" to x8, and "waiting for parcel" to x9. Furthermore, estimation model generation unit 14 sets "number of parcels" to the explanatory variable x10.

Estimation model generation unit 14 estimates coefficients (α1, α2, α3, α4, α5, α6, α7, α8, α9, α10, c) of formula 1 by a predetermined estimation method based on the first work time digitized data and a work time estimation model (multiple regression model) shown in formula 1 below.

$$y = \alpha 1x1 + \alpha 2x2 + \alpha 3x3 + \alpha 4x4 + \alpha 5x5 + \alpha 6x6 + \alpha 7x7 + \alpha 8x8 + \alpha 9x9 + \alpha 10x10 + c \quad \text{(formula 1)}$$

Estimation model generation unit 14 generates a plurality of work time estimation models by using a plurality of estimation methods such as gradient boosting, a decision tree, or a combination thereof as a predetermined estimation method.

Although the coefficient is estimated from three sets of objective variables and explanatory variables in FIG. 12, it is actually desirable to estimate the coefficients from more sets.

(Generation Method of Travel Time Estimation Model)

FIG. 13 is a diagram for explaining a generation method of a travel time estimation model. Estimation model generation unit 14 acquires the first travel time digitized data from first data pre-processing unit 13. An example of the first travel time digitized data shown in FIG. 13 is the same as that shown in FIG. 11B.

As shown in FIG. 13, estimation model generation unit 14 sets the travel time of the first travel time digitized data to objective variable y. Further, estimation model generation unit 14 sets the dummy variable "sunny or not" to explanatory variable x1, "rainy or not" to x2, "cloudy or not" to x3, "congestion" to x4, "worker features" to x5, "(X3, Y3)→(X1, X1)" to x6, "(X1, Y1)→(X2, X2)" to x7, and "(X2, Y2)→(X3, X3)" to x8.

Estimation model generation unit 14 estimates coefficients (α1, α2, α3, α4, α5, α6, α7, α8, c) of formula 2 by a predetermined estimation method based on the first travel time digitized data and a travel time estimation model (multiple regression model) shown in formula 2 below.

$$y = \alpha 1x1 + \alpha 2x2 + \alpha 3x3 + \alpha 4x4 + \alpha 5x5 + \alpha 6x6 + \alpha 7x7 + \alpha 8x8 + c \quad \text{(formula 2)}$$

Estimation model generation unit 14 generates a plurality of travel time estimation models by using a plurality of estimation methods, such as gradient boosting, decision tree, or a combination thereof, as the predetermined estimation method.

Although the coefficients are estimated from three sets of objective variables and explanatory variables in FIG. 13, it is actually desirable to estimate the coefficients from more sets.

<<Accuracy Estimation Unit 15>>

Accuracy estimation unit 15 estimates the accuracy of the work time estimation model and the travel time estimation model estimated by estimation model generation unit 14. It is noted that, accuracy estimation unit 15, may also be separately provided with a first accuracy estimation unit configured to estimate the accuracy of the work time estimation model and a second accuracy estimation unit configured to estimate the accuracy of the travel time estimation model.

(Accuracy Estimation of Work Time Estimation Model)

Specifically, accuracy estimation unit 15 calculates a mean absolute percentage error (MAPE) for the work time estimation model and estimates the calculated MAPE as the accuracy of the work time estimation model. MAPE is calculated according to formula 3 below.

[Formula 3]

$$MAPE = \frac{1}{N}\sum\left|\frac{yi - Yi}{yi}\right| \quad \text{(Formula 3)}$$

Here, yi represents an actual measurement value of the i-th work time. That is, yi indicates the “work time” (y) shown in FIG. 12.

Yi represents a predicted value of the i-th work time. That is, Yi indicates the value of y obtained by substituting x1 to x10 shown in FIG. 12 into formula 1. N indicates the number of samples. In the example of FIG. 12, N=3.

It is noted that, accuracy estimation unit 15 may estimate the averaged accuracy by dividing the actual measurement value of the work time of the number of samples N into n and performing cross-validation.

Accuracy estimation unit 15 writes the work time estimation model with the highest accuracy (the smallest MAPE) among the plurality of work time estimation models (formula 1) estimated by estimation model generation unit 14 into estimation model/accuracy storage unit 34 together with the accuracy (MAPE).

(Accuracy Estimation of Travel Time Estimation Model)

Accuracy estimation unit 15 calculates the accuracy (MAPE) for the travel time estimation model in accordance with formula 3, as in the case of the work time estimation model.

However, yi in formula 3 represents an actual measurement value of the i-th travel time. That is, yi indicates “travel time” (y) shown in FIG. 13.

Yi represents a predicted value of the i-th travel time. That is, Yi indicates the value of y obtained by substituting x1 to x8 shown in FIG. 13 into formula 2. N indicates the number of samples. In the example of FIG. 13, N=3.

Accuracy estimation unit 15 may estimate the averaged accuracy by dividing the actual measurement value of the work time of the number of samples N into n and performing cross-validation.

Accuracy estimation unit 15 writes the travel time estimation model with the highest accuracy (the smallest MAPE) among the plurality of travel time estimation models (formula 2) estimated by estimation model generation unit 14 into estimation model/accuracy storage unit 34 together with the accuracy (MAPE).

<<Estimation Model/Accuracy Storage Unit 34>>

FIG. 14A is a diagram showing an example of the work time determination model stored in estimation model/accuracy storage unit 34. FIG. 14B is a diagram showing an example of the travel time determination model stored in estimation model/accuracy storage unit 34.

Referring to FIG. 14A, estimation model/accuracy storage unit 34 stores the coefficients of the work time determination model shown in formula 1 and the accuracy (MAPE) of the model as the work time determination model. For example, (1, 2, 1, 1, 1, 1, 2, 1, 3, 2, 1) is stored as the coefficients (α1, α2, α3, α4, α5, α6, α7, α8, α9, α10, c) of formula 1, and 0.0091 is stored as the MAPE.

Referring to FIG. 14B, estimation model/accuracy storage unit 34 stores, as the travel time determination model, the coefficients of the travel time determination model shown in formula 2 and the accuracy (MAPE) of the model. For example, (1, 2, 1, 2, 1, 2, 2, 2, 45) is stored as the coefficients (α1, α2, α3, α4, α5, α6, α7, α8, c) of formula 2, and 0.0089 is stored as the MAPE.

With the configuration of operation plan generation apparatus 100 described above, an estimation model for estimating work time and travel time is generated.

In the configuration of operation plan generation apparatus 100 described below, the work time and the travel time are estimated using the work time estimation model and the travel time estimation model stored in estimation model/accuracy storage unit 34.

<<Operation Plan Input Unit 16>>

Operation plan input unit 16 receives an input of the operation plan which is the operation plan of the vehicle to the delivery destination of the parcel. The input of the operation plan is performed by the user, who is the delivery manager, using the input means such as a keyboard connected to operation plan generation apparatus 100, for example.

FIG. 15 is a diagram showing an example of operation plan information received by operation plan input unit 16. The operation plan information includes, for example, “delivery ID”, “delivery date and time”, “vehicle ID”, “driver ID”, “delivery source representative point coordinates”, “delivery destination representative point coordinates”, “number of parcels”, “travel time”, and “work time”.

For example, the operation plan information shown in FIG. 15 indicates that the delivery ID is “XX-4”, the delivery date and time of the parcel is “20YY/MM/DD 13:00”, the vehicle of vehicle ID “002” driven by the driver identified by driver “B” moves from the delivery source of coordinate (X3, Y3) to the delivery destination of coordinate (X1, Y1) in 55 minutes, and the driver of the vehicle is scheduled to perform the work (for example, unloading) corresponding to five parcels at the delivery destination of coordinate (X1, Y1) for 20 minutes. Operation plan input unit 16 writes the received operation plan information into operation plan information storage unit 35.

<<Second Data Pre-Processing Unit 17A>>

Second data pre-processing unit 17A reads the operation plan information received by operation plan input unit 16 from operation plan information storage unit 35, and reads the external information from external information storage unit 32. First data pre-processing unit 13 executes pretreatment by representing a part of the read information with dummy variables and digitizes the information. Second data pre-processing unit 17A executes the pretreatment related to the work time in the operation plan information.

FIG. 16A shows an example of information read by second data pre-processing unit 17A from operation plan information storage unit 35 and external information storage unit 32. The read information includes information of "weather", "driver ID", "delivery destination representative point information", "number of parcels", and "work time".

The "weather" is included in the external information read from external information storage unit 32. The weather here is, for example, a weather forecast. The "driver ID", the "delivery destination representative point information", the "number of parcel", and the "work time" are included in the operation plan information read from operation plan information storage unit 35. It is noted that, the operation plan information and the external information of the same "delivery ID" are associated with each other.

For example, the information of the delivery ID "XX-1" read by second data pre-processing unit 17A indicates during a time period of "sunny" weather, a driver identified as driver ID "B" is scheduled to deliver "five" parcels to the delivery destination of the delivery destination representative point coordinates (X1, Y1) and perform the "20-minutes" work at the delivery destination.

Second data pre-processing unit 17A reads feature data indicating the driver feature and feature data indicating the delivery destination feature from feature data storage unit 33.

Second data pre-processing unit 17A replaces the information shown in FIG. 16A based on the feature data shown in FIG. 6 and FIG. 7. The replacement method is the same as the replacement method by first data pre-processing unit 13 described with reference to FIG. 8.

FIG. 16B shows an example of data (hereinafter referred to as "second work time replacement data") obtained by the replacement.

The second work time replacement data includes information of "weather", "worker features", "work location", "inspection", "waiting for parcel", "number of parcels", and "work time".

The "weather", "number of parcels" and "work time" are the same as those shown in FIG. 16A. The "worker features" is data obtained by the replacement processing based on the feature data (FIG. 6) of the driver. The "work location", "inspection", and "waiting for parcel" are data obtained by the replacement processing based on the feature data (FIG. 7) of the delivery destination.

For example, the second work time replacement data includes data formed of a combination of weather "sunny", worker features "novice", work location "good", inspection "no", waiting for parcel "yes", number of parcels "five", and work time "20 minutes".

Second data pre-processing unit 17A converts the second work time replacement data into a dummy variable using the conversion table shown in FIG. 9A.

The method of converting the second work time replacement data is the same as the method of converting the first work time replacement data by first data pre-processing unit 13 described with reference to FIG. 9A.

FIG. 17 shows digitized data (hereinafter referred to as "second work time digitized data") obtained by converting the second work time replacement data shown in FIG. 16B into dummy variables using the conversion table shown in FIG. 9A.

The second work time digitized data includes each value of dummy variables "sunny or not", "rainy or not", "cloudy or not", "worker features", "good work location or not", "normal work location or not", "bad work location or not", "inspection", and "waiting for parcel", and information of "number of parcels" and "work time".

For example, the second work time digitized data in the first line indicates that the dummy variable "sunny or not" has a value of "one", "rainy or not" has a value of "zero", "cloudy or not" has a value of "zero", "worker features" has a value of "zero", "good work location or not" has a value of "one", "normal work location or not" has a value of "zero", "bad work location or not" has a value of "zero", "inspection" has a value of "zero", "waiting for parcel" has a value of "one", "number of parcels" has a value of "5", and "work time" has a value of "20 minutes".

<<Work Time Estimation Unit 17>>

Work time estimation unit 17 estimates the work time at the delivery destination by the driver indicated in the operation plan information based on the second work time digitized data generated by second data pre-processing unit 17A and the work time estimation model stored in estimation model/accuracy storage unit 34.

FIG. 18A shows an example of coefficients of the work time estimation model stored in estimation model/accuracy storage unit 34. According to FIG. 18A, the coefficients ($\alpha1$, $\alpha2$, $\alpha3$, $\alpha4$, $\alpha5$, $\alpha6$, $\alpha7$, $\alpha8$, $\alpha9$, $\alpha10$, c) of formula 1 are (1, 2, 1, 1, 1, 1, 2, 1, 3, 2, 1).

FIG. 18B shows an example of the second work time digitized data generated by second data pre-processing unit 17A and the work time estimated by work time estimation unit 17. The values of dummy variables "sunny or not", "rainy or not", "cloudy or not", "worker features", "good work location or not", "normal work location or not", "bad work location or not", "inspection", and "waiting for parcel" of the second work time digitized data are set as the values of the explanatory variables x1, x2, x3, x4, x5, x6, x7, x8, and x9, respectively. Further, the value of "number of parcels" of the second work time digitized data is set as the value of the explanatory variable x10.

Work time estimation unit 17 substitutes the values of the explanatory variables x1 to x10 into formula 1, and calculates the value of objective variable y to be 16. The value "16" of objective variable y is the estimated value of the work time.

<<Estimated Value Display Unit 18>>

Estimated value display unit 18 displays the work time of the driver at the delivery destination included in the operation plan information received by operation plan input unit 16 and stored in operation plan information storage unit 35, and the work time estimated by work time estimation unit 17.

FIG. 19 is a diagram showing an example of an image displayed on the screen of the display device connected to operation plan generation apparatus 100.

Estimated value display unit 18 displays the delivery destination representative point coordinates and the planned work time (planned value of work time) on the screen of the display device based on the operation plan information. For example, the work time planned by the user at the delivery destination representative point (X1, Y1) is "20 minutes". Similarly, the planned work time at the delivery destination representative points (X2, Y2) and "X2, Y3" is "30 minutes" and "35 minutes", respectively.

When a work time estimation execution button 40 is pressed on the screen by the input operation by the user, work time estimation unit 17 executes the estimation processing of the work time, and the estimated value of the work time is displayed as the estimated work time. For example, the estimated work time at the delivery destination representative point (X1, Y1) is "16 minutes". Similarly, the estimated work time at the delivery destination representative points (X2, Y2) and (X3, Y3) is "25 minutes" and "40 minutes", respectively.

When any of the estimated work time on the screen is selected by the input operation by the user, the screen is switched, and the influence level display processing by influence level display unit 19 is executed.

<<Influence Level Display Unit 19>>

Influence level display unit 19 displays the influence level of the external information and the feature data corresponding to the estimated work time selected by the user.

FIG. 20 is a diagram showing an example of an image displayed on the screen of the display device connected to operation plan generation apparatus 100.

When the estimated work time "16 minutes" is selected on the screen shown in FIG. 19, for example, influence level display unit 19 displays a combination of the influence elements and the influence time, which is the breakdown of the estimated work time "16 minutes", as the influence level.

The influence elements indicate external information or feature data used for the work time estimation by work time estimation unit 17, and includes, for example, "weather", "worker features", "work location", "inspection", "waiting for parcel", and "number of parcels". These pieces of information are the same as those of the information input to second data pre-processing unit 17A that performs the pretreatment of work time estimation unit 17. Further, the influence elements include "other". "Other" indicates the constant c in the coefficient of formula 1.

The influence time indicates a time affected by the influence elements in the estimated work time "16 minutes". For example, the influence element "weather" is converted into dummy variables x1, x2, and x3 by second data pre-processing unit 17A. Thus, the influence time of the influence element "weather" can be calculated as ($\alpha1\times x1+\alpha2\times x2+\alpha3\times x3$) in formula 1. For example, the influence time of the influence element "weather" is one minute.

Influence level display unit 19 calculates influence time for other influence elements from the dummy variables corresponding to the influence elements and formula 1 in the same manner.

Influence level display unit 19 may display the time of the breakdown of the estimated work time "16 minutes" as the influence level by a pie chart as shown in FIG. 20. Influence level display unit 19 may display the MAPE (for example, 0.0091) of the work time estimation model used to estimate the work time as the estimated accuracy.

<<Third Data Pre-Processing Unit 21A>>

Third data pre-processing unit 21A reads the operation plan information input from operation plan input unit 16 from operation plan information storage unit 35, and reads the external information from external information storage unit 32. Third data pre-processing unit 21A executes pretreatment of representing a part of the read information by a dummy variable, and digitizes the information. Third data pre-processing unit 21A executes the pretreatment related to travel time in the operation plan information. FIG. 21A shows an example of information read by third data pre-processing unit 21A from operation plan information storage unit 35 and external information storage unit 32. The read information includes information of "weather", "congestion", "driver ID", "delivery source representative point information", "delivery destination representative point information", and "travel time". It is noted that, the external information and the operation plan information of the same "delivery ID" are associated with each other.

The "weather" and "congestion" are included in the external information read from external information storage unit 32. The weather here is, for example, a weather forecast. Further, the congestion is, for example, a congestion forecast. The "driver ID", the "delivery source representative point information", the "delivery destination representative point information", and the "travel time" are included in the operation plan information read from operation plan information storage unit 35.

For example, the information read by third data pre-processing unit 21A indicates that, during a time period of "sunny" weather, congestion is expected to occur, and the driver identified by the driver ID "B" is scheduled to move from the delivery source of the delivery source representative point coordinates (X3, Y3) to the delivery destination of the delivery destination representative point coordinates (X1, Y1) in "55 minutes". Third data pre-processing unit 21A reads feature data indicating the feature of the driver from feature data storage unit 33.

Third data pre-processing unit 21A replaces the information shown in FIG. 21A based on the feature data shown in FIG. 6. The replacement method is the same as the replacement method by first data pre-processing unit 13 described with reference to FIG. 10.

FIG. 21B shows an example of data (hereinafter referred to as "second travel time replacement data") obtained by replacement.

The second travel time replacement data includes information of "weather", "congestion", "worker features", "delivery source representative point coordinates", "delivery destination representative point coordinates", and "travel time".

The "weather", the "congestion", the "delivery source representative point coordinates", the "delivery destination representative point coordinates", and the "travel time" are the same as those illustrated in FIG. 21A. The "worker features" is data obtained by the replacement processing based on the feature data (FIG. 6) of the driver.

For example, the second travel time replacement data includes data formed of a combination of weather "sunny", congestion "yes", worker features "novice", delivery source representative point coordinates (X3, Y3), delivery destination representative point coordinates (X1, Y1), and travel time "55 minutes".

FIG. 22 shows digitized data (hereinafter referred to as "second travel time digitized data") obtained by converting the second travel time replacement data shown in FIG. 21B into dummy variables using the conversion table shown in FIG. 11A.

The second travel time digitized data includes each value of dummy variables "sunny or not", "rainy or not", "cloudy or not", "congestion", "worker features", "(X3, Y3)→(X1, X1)", "(X1, Y1)→(X2, X2)", and "(X2, Y2)→(X3, X3)", and information of the "travel time".

The second travel time digitized data in the first line indicates that the dummy variable "sunny or not" has a value of "one", "rainy or not" has a value of "zero", "cloudy or not" has a value of "zero", "congestion" has a value of "one", "worker features" has a value of "zero", "(X3, Y3)-+(X1, X1)" has a value of "one", "(X1, Y1)→(X2, X2)" has a value of "zero", "(X2, Y2)→(X3, X3)" has a value of "zero", and "travel time" has a value of "55 minutes".

<<Travel Time Estimation Unit 21>>

Travel time estimation unit 21 estimates the travel time to the delivery destination by the driver indicated in the operation plan information based on the second travel time digitized data generated by third data pre-processing unit 21A and the travel time estimation model stored in estimation model/accuracy storage unit 34.

FIG. 23A shows an example of coefficients of the travel time estimation model stored in estimation model/accuracy storage unit 34. According to FIG. 23A, the coefficients (α1, α2, α3, α4, α5, α6, α7, α8, c) of formula 2 are (1, 2, 1, 2, 1, 2, 2, 2, 45).

FIG. 23B shows an example of the second travel time digitized data generated by third data pre-processing unit 21A and the travel time estimated by travel time estimation unit 21. The values of the dummy variables "sunny or not", "rainy or not", "cloudy or not", "congestion", "worker features", "(X3, Y3)→(X1, X1)", "(X1, Y1)→ (X2, X2)", and "(X2, Y2)→(X3, X3)" in the second travel time digitized data are respectively set as the values of the explanatory variables x1, x2, x3, x4, x5, x6, x7, and x8.

Travel time estimation unit 21 substitutes the values of the explanatory variables x1 to x8 into formula 2 and calculates the value of objective variable y to be 50. The value "50" of objective variable y is the estimated value of travel time.

<<Operation Plan Creation Unit 20>>

Operation plan creation unit 20 corrects the operation plan information received by operation plan input unit 16 and stored in operation plan information storage unit 35, based on the work time estimated by work time estimation unit 17 and the travel time estimated by travel time estimation unit 21. FIG. 24 is a diagram showing an example of the operation plan information corrected by operation plan creation unit 20.

The operation plan information includes, for example, "delivery ID", "delivery date and time", "vehicle ID", "driver ID", "delivery source representative point coordinates", "delivery destination representative point coordinates", "number of parcels", "travel time", and "work time".

This operation plan information is obtained by correcting the travel time and the work time in the operation plan information received by operation plan input unit 16 shown in FIG. 15. That is, the travel time "55 minutes" in FIG. 15 is corrected to "50 minutes", and the work time "20 minutes" is corrected to "16 minutes".

[Processing Flow of Operation Plan Generation Apparatus 100]

Figure 25:
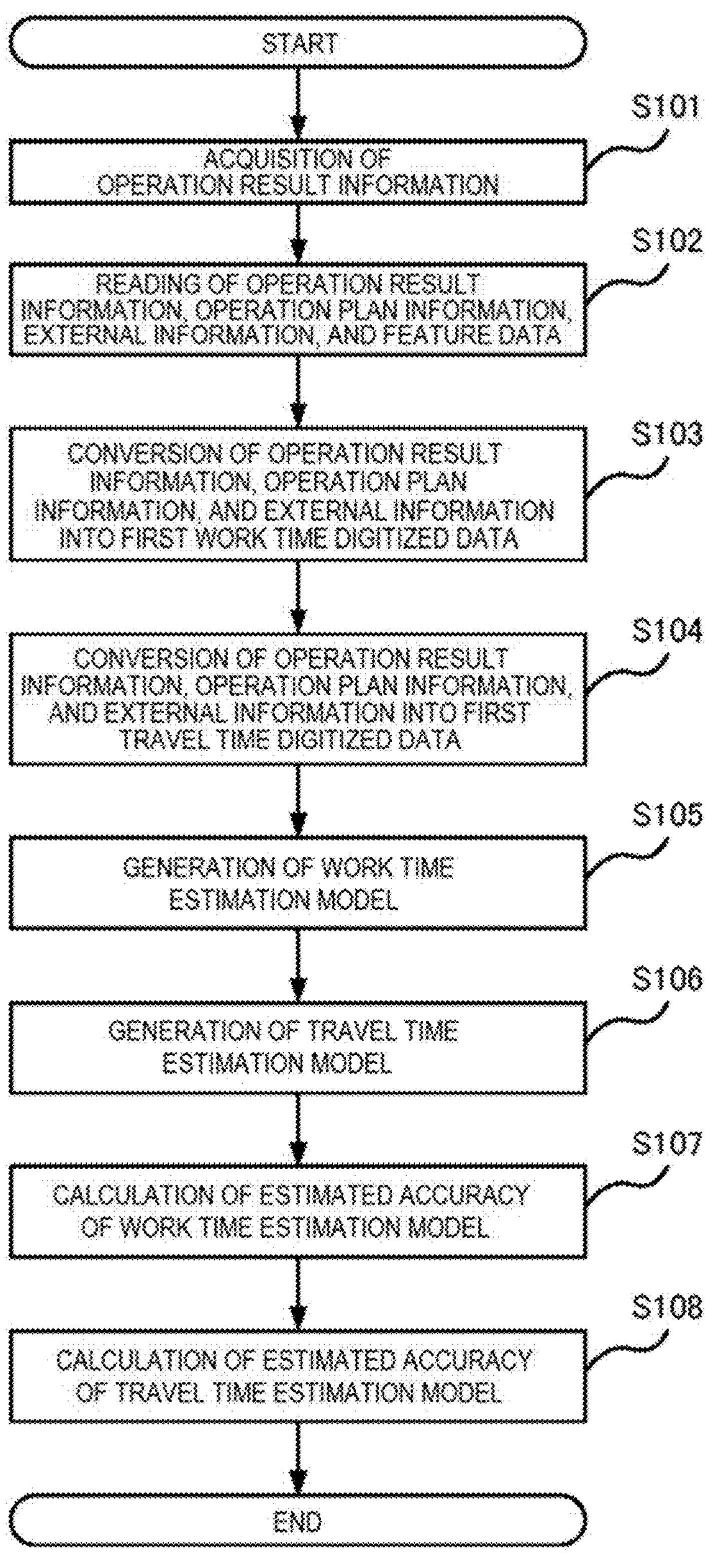
FIG. 25 is a flowchart showing the procedure of generation processing of the work time estimation model and the travel time estimation model by the operation plan generation apparatus.

Next, a flow of processing of operation plan generation apparatus 100 will be described. FIG. 25 is a flowchart showing the procedure of generation processing of the work time estimation model and the travel time estimation model by operation plan generation apparatus 100.

Operation result acquisition unit 11 acquires operation result information corresponding to the operation plan to the operation destination of the vehicle from the vehicle-mounted apparatus of the vehicle, adds the delivery ID and the number of parcels to the acquired operation result information, and writes the operation result information to operation plan information storage unit 35 (step S101). An example of the operation result information acquired from the vehicle-mounted apparatus is as shown in FIG. 3. An example of the operation result information written in operation plan information storage unit 35 is as shown in FIG. 4.

First data pre-processing unit 13 reads the operation result information from operation result information storage unit 31, reads the external information from external information storage unit 32, and reads the operation plan information from operation plan information storage unit 35. First data pre-processing unit 13 reads feature data indicating the feature of the driver and feature data indicating the feature of the delivery destination from feature data storage unit 33 (step S102). Examples of the read operation result information, external information, and operation plan information are shown in FIG. 8A and FIG. 10A. An example of the feature data indicating the feature of the read driver is as shown in FIG. 6. An example of the feature data indicating the read feature of the delivery destination is as shown in FIG. 7.

First data pre-processing unit 13 converts the read operation result information, external information, and operation plan information into first work time digitized data (step S103). The conversion processing to the first work time digitized data is as described with reference to FIG. 8A, FIG. 8B, FIG. 9A, and FIG. 9B.

First data pre-processing unit 13 converts the read operation result information, external information, and operation plan information into first travel time digitized data (step S104). The conversion processing into the first travel time digitized data is as described with reference to FIG. 10A, FIG. 10B, FIG. 11A, and FIG. 11B.

Estimation model generation unit 14 generates a work time estimation model for estimating the work time of the delivery destination driver based on the first work time digitized data generated in step S103 (step S105). The generation processing of the work time estimation model is the same as that described with reference to FIG. 12.

Estimation model generation unit 14 generates a travel time estimation model for estimating the travel time from the delivery source to the delivery destination based on the first travel time digitized data generated in step S104 (step S106). The generation processing of the travel time estimation model is as described with reference to FIG. 13.

Accuracy estimation unit 15 calculates the estimated accuracy of the work time by the work time estimation model generated in step S105 (step S107). The accuracy estimation process of the work time estimation model is as described using formula 3.

Accuracy estimation unit 15 calculates the estimated accuracy of the travel time by the travel time estimation model generated in step S106 (step S108). The accuracy estimation process of the travel time estimation model is as described using formula 3.

Figure 26:
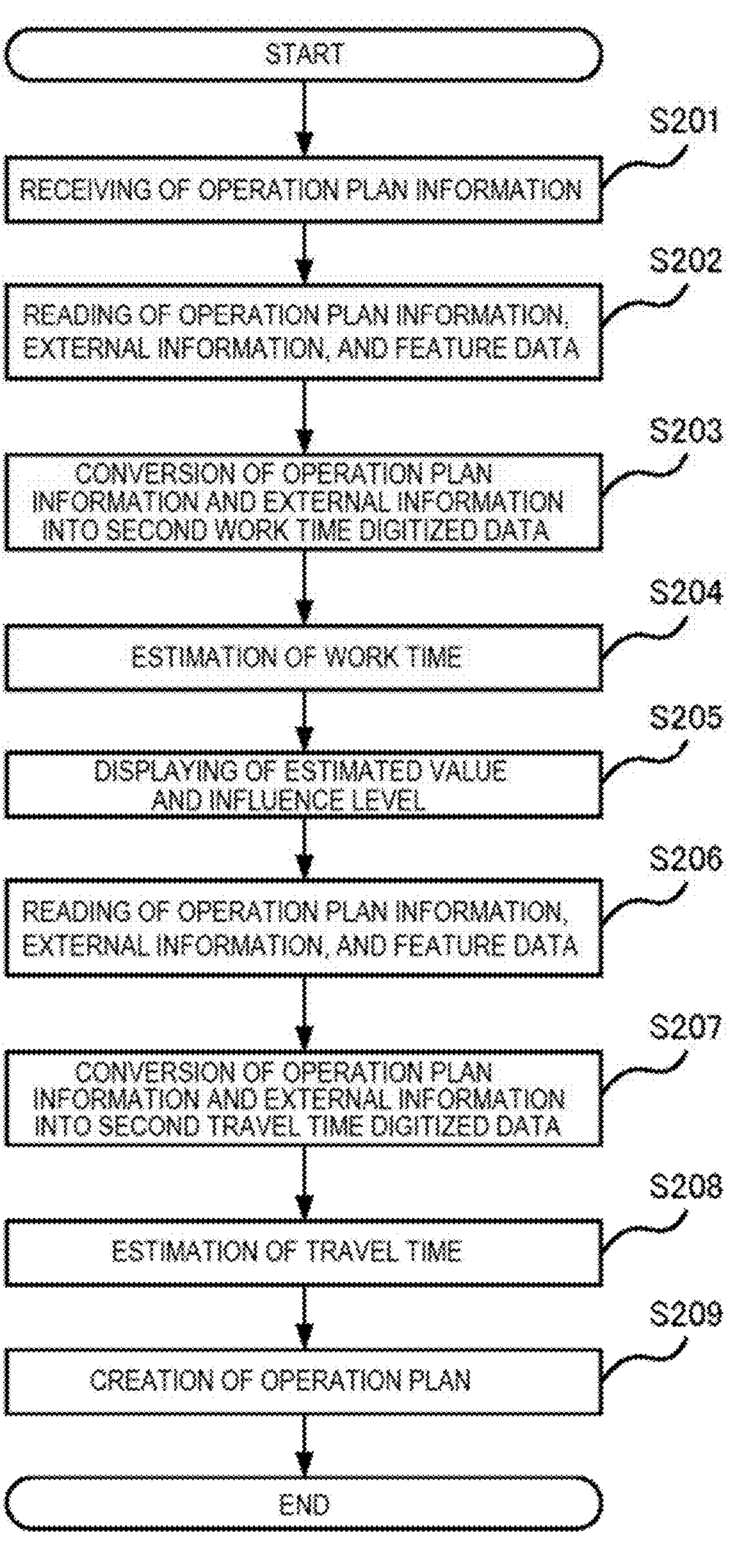
FIG. 26 is a flowchart showing the procedure of the generation processing of the operation plan of the vehicle by the operation plan generation apparatus.

FIG. 26 is a flowchart showing the procedure of the generation processing of the operation plan of the vehicle by operation plan generation apparatus 100.

Operation plan input unit 16 receives the operation plan information of the vehicle input by the user and writes the operation plan information in operation plan information storage unit 35 (step S201). An example of the operation plan information is as shown in FIG. 15.

Second data pre-processing unit 17A reads the operation plan information input from operation plan input unit 16 from operation plan information storage unit 35, and reads the external information from external information storage unit 32. Further, second data pre-processing unit 17A reads feature data indicating the feature of the driver and feature data indicating the feature of the delivery destination from feature data storage unit 33 (step S202). An example of the operation plan information and the external information read out is as shown in FIG. 16A. An example of the feature data indicating the read feature of the driver is as shown in FIG. 6, and the feature data indicating the read feature of the delivery destination is as shown in FIG. 7.

Second data pre-processing unit 17A converts the read operation plan information and external information into second work time digitized data (step S203). The conversion processing to the second work time digitized data is as described with reference to FIG. 16 and FIG. 17.

Work time estimation unit 17 estimates the work time at the delivery destination by the driver indicated in the operation plan information based on the second work time digitized data generated in step S203 and the work time estimation model stored in estimation model/accuracy storage unit 34 (step S204). The work time estimation process is as described with reference to FIG. 18A and FIG. 18B.

Estimated value display unit 18 displays the estimated value of the work time on the screen of the display unit, and influence level display unit 19 displays the influence level of the external information and the feature data corresponding to the estimated work time on the screen (step S205). An example of display by estimated value display unit 18 is as shown in FIG. 19, and an example of display by influence level display unit 19 is as shown in FIG. 20.

Third data pre-processing unit 21A reads the operation plan information input from operation plan input unit 16 from operation plan information storage unit 35, and reads the external information from external information storage unit 32. Further, third data pre-processing unit 21A reads feature data indicating the feature of the driver from feature data storage unit 33 (step S206). An example of the read operation plan information and external information is as shown in FIG. 21A. Further, an example of the read feature data indicating the feature of the driver is as shown in FIG. 6.

Third data pre-processing unit 21A converts the read operation plan information and external information into second travel time digitized data (step S207). The conversion processing into the second travel time digitized data is as described with reference to FIG. 21A, FIG. 21B, and FIG. 22.

Travel time estimation unit 21 estimates the travel time to the delivery destination by the driver indicated in the operation plan information based on the second travel time digitized data generated in step S207 and the travel time estimation model stored in estimation model/accuracy storage unit 34 (step S208). The travel time estimation process is as described with reference to FIG. 23A and FIG. 23B.

Operation plan creation unit 20 corrects the operation plan information received in the step S201 and stored in operation plan information storage unit 35 based on the work time estimated in the step S204 and the travel time estimated in the step S208 (step S209). An example of the operation plan information after the correction as shown in FIG. 24.

Effects of Embodiments

As described above, according to the embodiment of the present disclosure, operation plan generation apparatus 100 can estimate the work time of the driver and the travel time of the vehicle in consideration of the external information indicating the event that may influence the implementation of the operation plan and the feature data indicating the feature of the driver or the operation destination. Thus, it is possible to generate the operation plan that includes appropriate work time and travel time for the driver.

Also, operation plan generation apparatus 100 can estimate the work time based on the work time estimation model generated based on the operation result information, the external information, and the feature data. Thus, it is possible to estimate the appropriate work time for the driver.

Also, operation plan generation apparatus 100 can estimate the travel time based on the travel time estimation model generated based on the operation result information, the external information, and the feature data. Thus, it is possible to estimate the appropriate travel time for the driver.

Work time estimation unit 17 estimates the work time using the dummy variable. Thus, it is possible to estimate the work time by replacing qualitative data with quantitative data.

Further, travel time estimation unit 21 estimates the travel time using the dummy variables. Thus, it is possible to estimate the travel time by replacing qualitative data with quantitative data.

In addition, operation plan generation apparatus 100 can generate the work time estimation model or the travel time estimation model by itself. Thus, it is possible to generate a model that takes into account the driver's past operation result information, enabling the generation of a more suitable model for the driver.

Also, operation plan generation apparatus 100 can estimate accuracy of the work time estimation model or the travel time estimation model. Thus, it is possible to evaluate the accuracy of the estimated work time or travel time using the work time estimation model or travel time estimation model.

Further, operation plan generation apparatus 100 can estimate the work time based on the most accurate work time estimation model. Thus, it is possible to estimate the work time accurately.

Further, operation plan generation apparatus 100 can estimate the travel time based on the most accurate travel time estimation model. Thus, it is possible to estimate the travel time accurately.

The external information includes any one of weather information at the operation destination, congestion information along an operation route of the vehicle, predicted weather information at the operation destination, signal information of a traffic signal present along the operation route, and biological information of the driver. The weather information, the predicted weather information, and the biological information affect the travel time by the vehicle and the work time at the operation destination, while congestion information and signal information affect the travel time by the vehicle. Thus, by considering these pieces of information, it is possible to estimate the work time and the travel time appropriate for the driver.

The feature data includes at least one of data indicating a skill level of the driver and data indicating a work environment at the operation destination. The driver's skill level affects the travel time by the vehicle and the work time at the operation destination, while the work environment at the operation destination affects the work time at the operation destination. Thus, by considering these pieces of information, it is possible to estimate the work time and the travel time appropriate for the driver.

Further, estimated value display unit 18 displays the work time of the driver at the delivery destination included in the operation plan information input by the user and the work time estimated by work time estimation unit 17. Thus, by viewing the display screen, the user can compare the inputted work time by the user and the estimated work time. Thus, the user can know whether the inputted work time was appropriate or not, and can set the appropriate work time when manually generating an operation plan from next time.

Further, influence level display unit 19 displays the influence level of the external information and the feature data corresponding to the work time estimated by work time estimation unit 17. Thus, by viewing the display screen, the user can analyze the information or data that is influencing the work time. Thus, the work time can be improved by taking measures to reduce the influence based on the analysis result.

APPENDIX

In the above-described embodiments, the delivery target by the vehicle is a parcel, but the delivery target is not limited to the parcel. For example, a person may be the delivery target. In this case, operation plan generation apparatus 100 generates an operation plan for transporting a person to a delivery destination and performing work such as getting off the person at the delivery destination.

Further, some or all of the components constituting operation plan generation apparatus 100 may be constituted by one or more semiconductor devices such as system LSIs.

Further, the computer program may be recorded in a computer-readable non-transitory recording medium, for example, an HDD, a CD-ROM, or a semiconductor memory, and distributed. Further, the computer program may be distributed by being transmitted via an electric communication line, a wireless or wired communication line, a network represented by the Internet, data broadcasting, or the like. Further, operation plan generation apparatus 100 may be implemented by a plurality of computers or a plurality of processors. For example, the configuration of operation plan generation apparatus 100 for generating the work time estimation model and the travel time estimation model may be implemented as an estimation model generation apparatus by a computer different from operation plan generation apparatus 100.

In addition, some or all of the functions of operation plan generation apparatus 100 may be provided by cloud computing. That is, a part or all of the functions of operation plan generation apparatus 100 may be implemented by a cloud server.

The embodiments disclosed herein are to be considered in all respects as illustrative and not restrictive. The scope of the present disclosure is defined by the appended claims rather than the foregoing description, and is intended to include all modifications within the scope and meaning equivalent to the claims.

REFERENCE SIGNS LIST 11 operation result acquisition unit 12 external information acquisition unit 13 first data pre-processing unit 14 estimation model generation unit accuracy estimation unit 16 operation plan input unit 17 work time estimation unit 17A second data pre-processing unit 18 estimated value display unit 19 influence level display unit operation plan creation unit 21 travel time estimation unit 21A third data pre-processing unit 31 operation result information storage unit 32 external information storage unit 33 feature data storage unit 34 estimation model/accuracy storage unit 35 operation plan information storage unit 40 work time estimation execution button 100 operation plan generation apparatus (estimation model generation apparatus)

The invention claimed is:

1. A system comprising:

a processor;

a memory; and a display device, wherein the processor is configured to:

receive an input of a first operation plan, the first operation plan being an operation plan of a vehicle, the first operation plan including data for a plurality of deliveries to be performed by the vehicle, each delivery of the plurality of deliveries being associated with a delivery ID, a vehicle ID, a driver ID, delivery source representative point coordinates, delivery destination representative point coordinates, a travel time from the delivery source to the delivery destination, and a work time related to at least one of unloading and loading at the delivery destination;

estimate a work time of a driver at an operation destination, based on the first operation plan, external information including a possible influencing event for realization of the first operation plan, and feature data indicating a feature of at least one of the driver of the vehicle and the operation destination of the vehicle;

estimate a travel time of the vehicle from an operation origin to the operation destination, based on the first operation plan, the external information, and the feature data;

correct the first operation plan, based on the estimated work time and the estimated travel time, wherein correcting the first operation plan includes adjusting, based on the delivery ID, a travel time or a work time of a subsequent delivery of the plurality of deliveries to account for an accumulated delay from one or more preceding deliveries of the plurality of deliveries, and send information to the display device to cause the display device to display (i) the work time of the driver at the operation destination included in the first operation plan and the estimated work time, and (ii) an influence level of the external information and the feature data corresponding to the estimated work time.

2. The operation plan generation apparatus according to claim 1, wherein the processor is configured to estimate the work time further based on a work time estimation model, and the work time estimation model is generated based on operation result information corresponding to a second operation plan, the external information corresponding to the second operation plan, and the feature data corresponding to the second operation plan, the second operation plan being an operation plan of the vehicle different from the first operation plan.

3. The operation plan generation apparatus according to claim 2, wherein the processor is further configured to generate the work time estimation model.

4. The operation plan generation apparatus according to claim 3, wherein the processor is further configured to estimate an accuracy of the work time estimation model.

5. The operation plan generation apparatus according to claim 4, wherein the processor is configured to generate, using a plurality of estimation methods, a plurality of the work time estimation models, the processor is configured to estimate an accuracy of each of the work time estimation models, and the processor is configured to estimate the work time using the work time estimation model having a highest estimated accuracy.

6. The operation plan generation apparatus according to claim 5, wherein the processor is configured to estimate the travel time further based on a travel time estimation model, and the travel time estimation model is generated based on the operation result information, the external information corresponding to the second operation plan, and the feature data corresponding to the second operation plan.

7. The operation plan generation apparatus according to claim 4, wherein the processor is configured to estimate the travel time further based on a travel time estimation model, and the travel time estimation model is generated based on the operation result information, the external information corresponding to the second operation plan, and the feature data corresponding to the second operation plan.

8. The operation plan generation apparatus according to claim 3, wherein the processor is configured to estimate the travel time further based on a travel time estimation model, and the travel time estimation model is generated based on the operation result information, the external information corresponding to the second operation plan, and the feature data corresponding to the second operation plan.

9. The operation plan generation apparatus according to claim 2, wherein the processor is configured to estimate the travel time further based on a travel time estimation model, and the travel time estimation model is generated based on the operation result information, the external information corresponding to the second operation plan, and the feature data corresponding to the second operation plan.

10. The operation plan generation apparatus according to claim 9, wherein the processor is further configured to generate the travel time estimation model.

11. The operation plan generation apparatus according to claim 10, wherein the processor is further configured to estimate an accuracy of the travel time estimation model.

12. The operation plan generation apparatus according to claim 11, wherein the processor is configured to generate, using a plurality of estimation methods, a plurality of the travel time estimation models, the processor is configured to estimate an accuracy of each of the travel time estimation models, and the processor is configured to estimate the travel time using the travel time estimation model having a highest estimated accuracy.

13. The operation plan generation apparatus according to claim 1, wherein the processor is configured to convert at least part of the first operation plan, the external information, and the feature data into a dummy variable, and estimate the work time using the dummy variable.

14. The operation plan generation apparatus according to claim 1, wherein the processor is configured to convert at least part of the first operation plan, the external information, and the feature data into a dummy variable, and estimate the travel time using the dummy variable.

15. The operation plan generation apparatus according to claim 1, wherein the external information includes any one of weather information at the operation destination, congestion information along an operation route of the vehicle, predicted weather information at the operation destination, signal information of a traffic signal present along the operation route, and biological information of the driver.

16. The operation plan generation apparatus according to claim 1, wherein the feature data includes at least one of data indicating a skill level of the driver and data indicating a work environment at the operation destination.

17. The system of claim 1, wherein the delivery source representative point coordinates of a first delivery of the plurality of deliveries match the delivery destination representative point coordinates of a last delivery of the plurality of deliveries, such that the vehicle returns to an original base after completing the plurality of deliveries.

18. The system of claim 1, wherein the influence level includes a first influence time indicating a time contribution of a first element of the external information or the feature data to the estimated work time, and a second influence time indicating a time contribution of a second element of the external information or the feature data to the estimated work time.

19. An operation plan generation method comprising:

receiving, at an operation plan generation apparatus, an input of a first operation plan, the first operation plan being an operation plan of a vehicle, the first operation plan including data for a plurality of deliveries to be performed by the vehicle each delivery of the plurality of deliveries being associated with a delivery ID, a vehicle ID, a driver ID, delivery source representative point coordinates, delivery destination representative point coordinates, a travel time from the delivery source to the delivery destination, and a work time related to at least one of unloading and loading at the delivery destination;

estimating, at the operation plan generation apparatus, a work time of a driver at an operation destination, based on the first operation plan, external information including a possible influencing event for realization of the first operation plan, and feature data indicating a feature of at least one of the driver of the vehicle and the operation destination of the vehicle;

estimating, at the operation plan generation apparatus, a travel time of the vehicle from an operation origin to the operation destination, based on the first operation plan, the external information, and the feature data;

correcting, at the operation plan generation apparatus, the first operation plan, based on the estimated work time and the estimated travel time, wherein correcting the first operation plan includes adjusting, based on the delivery ID, a travel time or a work time of a subsequent delivery of the plurality of deliveries to account for an accumulated delay from one or more preceding deliveries of the plurality of deliveries; and sending, by the operation plan generation apparatus, information to a display device to cause the display device to display (i) the work time of the driver at the operation destination included in the first operation plan and the estimated work time, and (ii) an influence level of the external information and the feature data corresponding to the estimated work time.

* * * * *